United States Patent [19]

Taniyama

[11] Patent Number: 5,392,906
[45] Date of Patent: Feb. 28, 1995

[54] EXPANDABLE STORAGE CONTAINER SYSTEM

[76] Inventor: Yoshihiko Taniyama, 9380 Old Southwick Pass, Fulton County, Alpharetta, Ga. 30202

[21] Appl. No.: 13,293

[22] Filed: Feb. 4, 1993

[51] Int. Cl.⁶ .......................................... B65D 85/57
[52] U.S. Cl. ................... 206/311; 206/309; 206/308.1; 220/4.27; 220/23.83
[58] Field of Search ............ 206/309, 311, 312, 444; 220/4.26, 4.27, 23.83, 23.86

[56] References Cited

U.S. PATENT DOCUMENTS

| 4,083,456 | 4/1978 | Genn et al. | 211/55 |
|---|---|---|---|
| 4,535,888 | 8/1985 | Nusselder | 206/444 |
| 4,630,732 | 12/1986 | Snyman | 206/445 |
| 4,655,345 | 4/1987 | Drake et al. | 206/309 |
| 4,702,369 | 10/1987 | Philosophe | 206/312 |
| 4,762,225 | 8/1988 | Henkel | 206/311 |
| 4,765,469 | 8/1988 | Seifert | 206/309 |
| 4,807,773 | 2/1989 | Tsai | 220/4.27 |
| 4,817,792 | 4/1989 | Seifert | 206/309 |
| 4,823,950 | 4/1989 | Roze | 206/311 |
| 4,848,585 | 7/1989 | Snyder | 220/4.27 |
| 4,850,477 | 7/1989 | Gelardi et al. | 206/45.19 |
| 4,871,218 | 10/1989 | Swinson et al. | 312/312 |
| 4,875,743 | 10/1989 | Gelardi et al. | 312/13 |
| 4,892,189 | 6/1990 | Kunimune et al. | 206/232 |
| 4,928,818 | 5/1990 | Friess et al. | 206/309 |
| 4,932,522 | 6/1990 | Milovich | 206/309 |
| 4,998,618 | 3/1990 | Borgions | 206/307 |
| 5,050,734 | 9/1991 | Chen | 206/444 |
| 5,180,058 | 1/1993 | Hu | 206/309 |

FOREIGN PATENT DOCUMENTS 0420350 4/1991 European Pat. Off. ............ 206/310

Primary Examiner—David T. Fidei
Attorney, Agent, or Firm—Troutman Sanders

[57] ABSTRACT

An expandable storage container for multiple objects which allows for compartments to be added or subtracted as needed. The container may include components such as a base tray, a cover, a double base tray, a double cover, and a dual tray. Hinge elements formed in the rear portions of the components allows each component to be hingedly connected to a corresponding component.

25 Claims, 14 Drawing Sheets

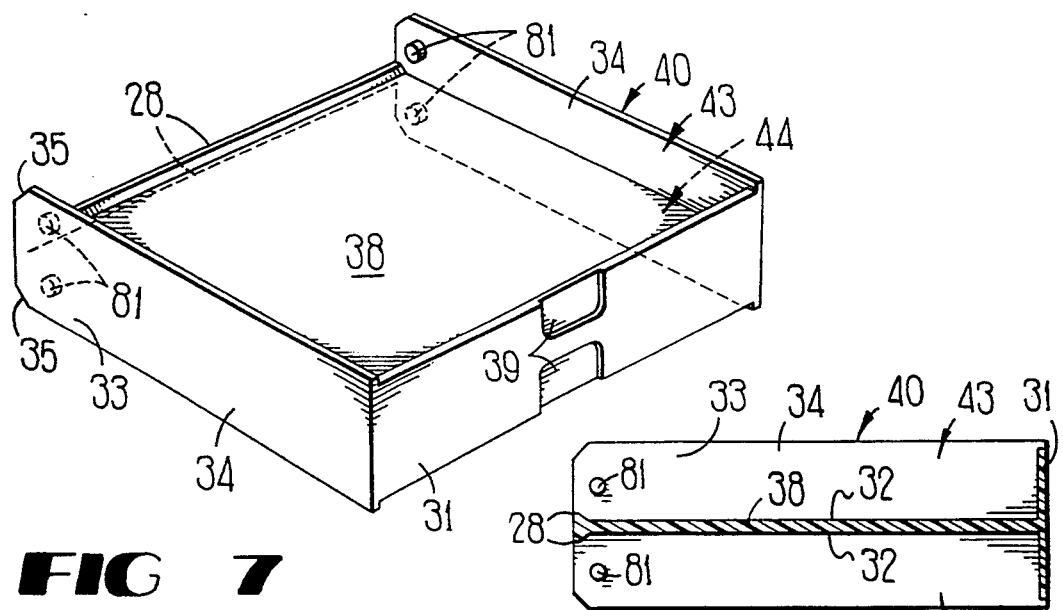
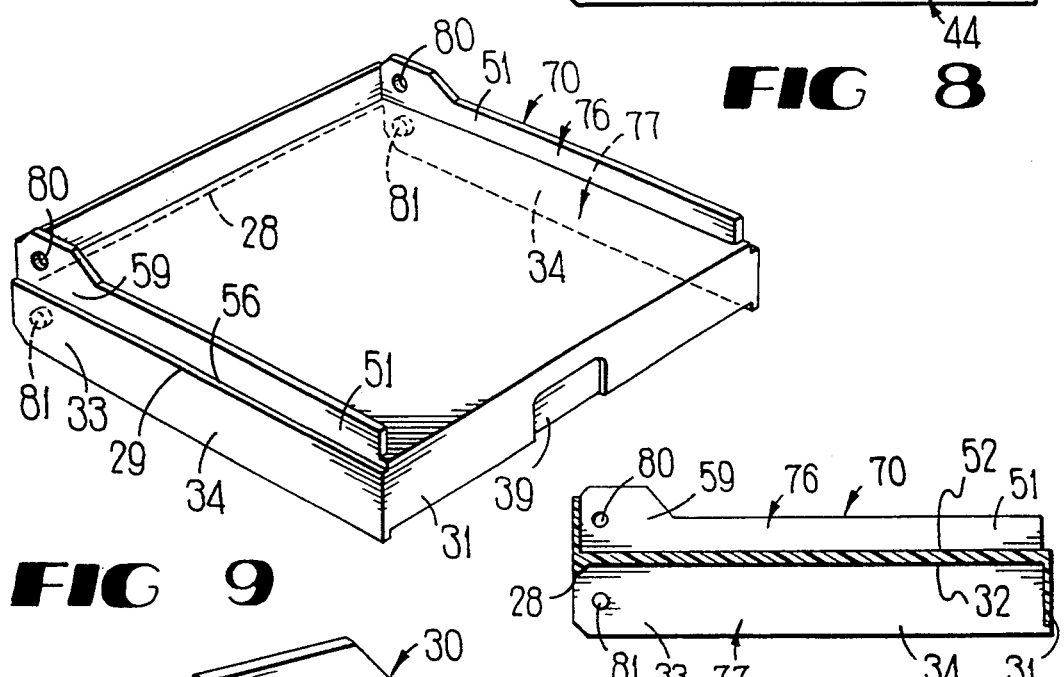
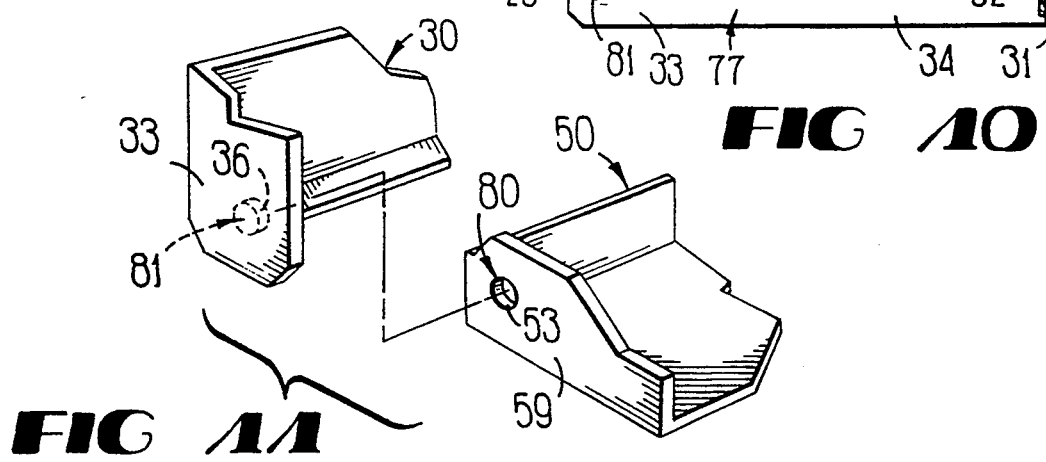

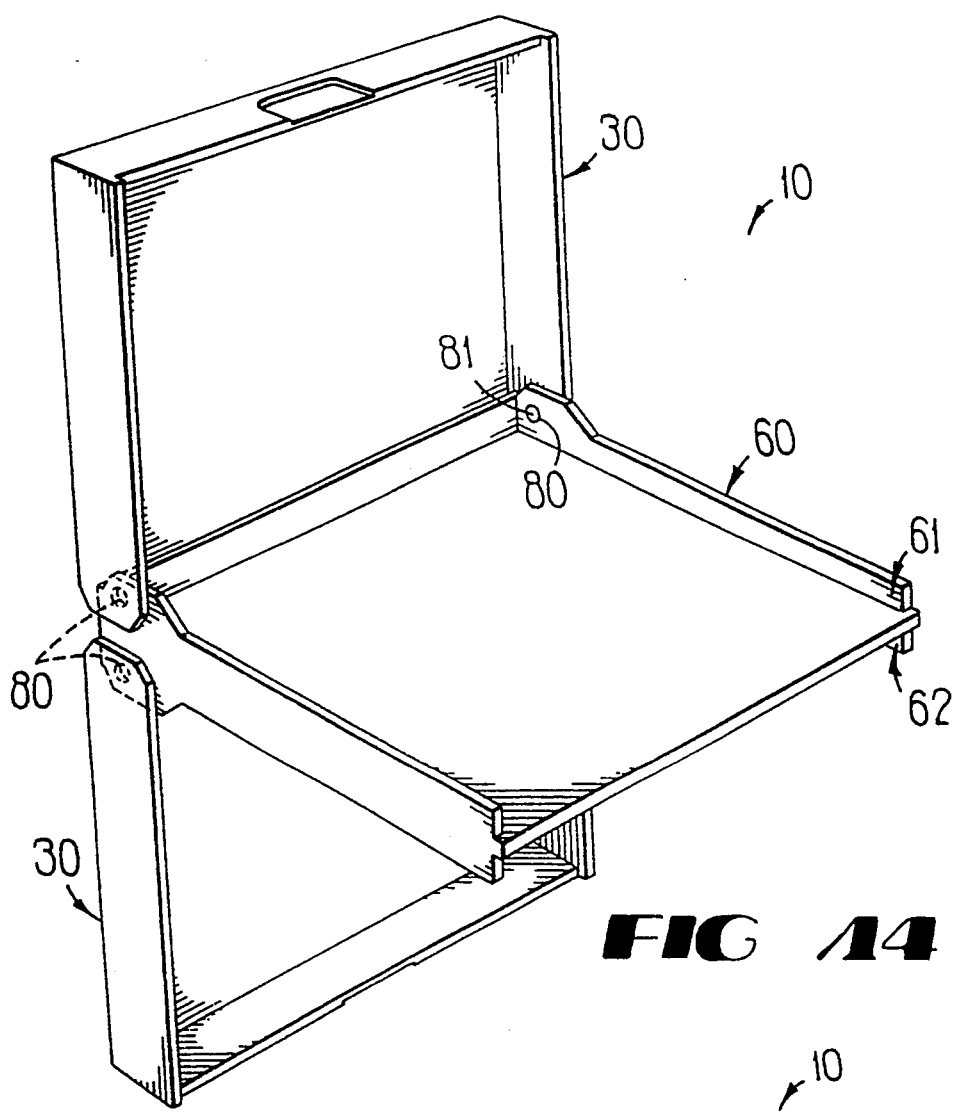
FIG. A4
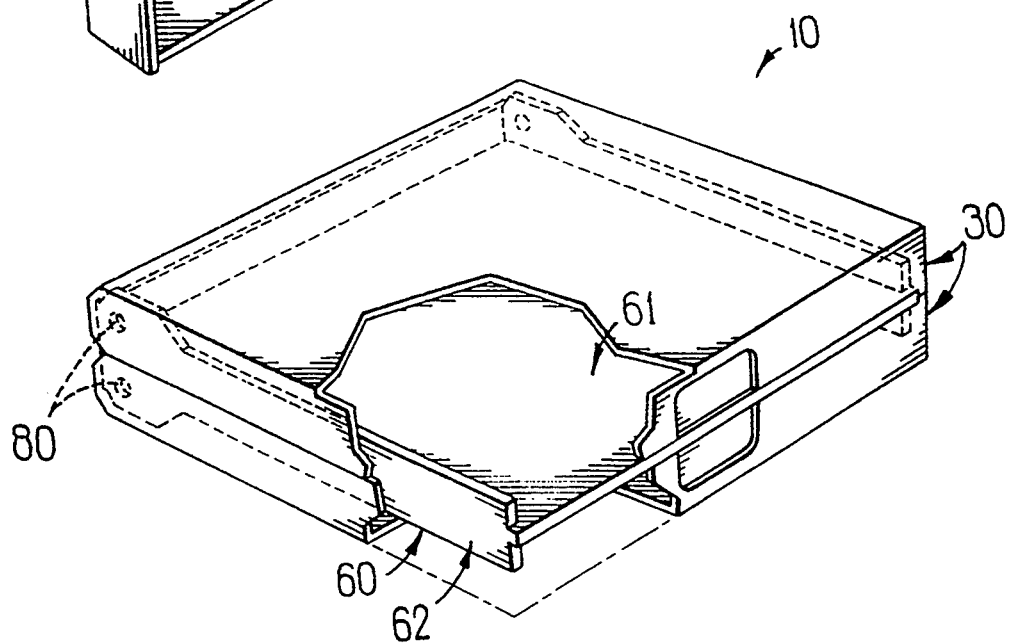
FIG. A5

EXPANDABLE STORAGE CONTAINER SYSTEM

BACKGROUND OF THE INVENTION

1. Field of Invention

The present invention relates to an expandable container for storing objects. More specifically, this invention relates to a multi-component container in which multiple objects, such as standard compact disks and mini-compact disk ("mini-CD") cartridges, may be packaged for retail sale and/or used for storage by the consumer.

2. Description of the Prior Art

Conventional storage containers for compact disks or the like are often called jewel boxes. The jewel box is usually made of transparent plastic and is rectangular in shape. Most of these containers consist of at least a cover and a base tray and can store only one compact disk.

Storage containers for multiple standard compact disks have become more prominent in recent years. Such containers for standard compact disks include jewel boxes with base trays having several compartments, rectangular box-like containers with disk separation means, and components similar to those of a jewel box with hinged connections.

In U.S. Pat. No. 4,892,189 (Kunimune et al), a multi-case with two or more concave portions formed on the cover and the base tray is described. Though this configuration allows a user to store several compact disks in one base tray, this design is limited by the number of concave portions which can be conveniently formed for the cover and base and seems to become cumbersome when more than four concave portions are formed.

In U.S. Pat. No. 4,630,732 (Snyman), U.S. Pat. No. 4,998,618 (Borgions), U.S. Pat. No. 4,655,345 (Drake et al), U.S. Pat. No. 4,932,522 (Milovich) and U.S. Pat. No. 4,702,369 (Philosophe) storage containers utilizing rectangular box-like containers with partitions, drawers, and the like are described. In Snyman's patent, a box-like container with a ramp, several partitions, and several floor disk restraints is described. The container allows several disks to be stored on their edges, such that they rest vertically on the ramp. When a disk restraint is pressed, the disk corresponding to the disk restraint is allowed to roll out of the box. In Borgions patent, a box-like container with partitions for each disk is described, such that the disks are stacked above each other with their surfaces resting upon the partitions. In Drake's patent, single disk containers may be stored along tracks side by side within the box-like container. In Milovich's patent, the single disk containers are stored in drawers, which are stacked vertically and run along tracks within the box-like container. Finally, Philosophe's patent, uses drawers much like Milovich's container, but the drawers have special storage features built into them, such that the disk can be securely inserted directly into the drawer.

The most significant drawback of the box-like storage containers is that each is limited by the size in which they are designed and manufactured, such that another box or different storage container must be employed to store one more disk than each of these box-like containers can hold. In other words, these containers are not adaptable to the users ever-changing needs. Further, these box containers are highly inefficient in terms of space when only a few disks need to be stored. Also, both Snyman's & Drake's box-like containers seem to cause unnecessary increased stress to the disk, since the disk is resting on its outer edges. Further, Drake's and Milovich's box-like containers also seem to be unwieldy because the user must open the drawer and then open the single disk container.

U.S. Pat. No. 4,535,888 (Nusselder) and a European Patent No. 420-350 (Brandt et al) describe modified base trays and covers hingedly connected to form a multiple disk storage container. As shown in FIG. 34, the container 10' described in the Nusselder patent holds up to four disks in two compartments. Appropriate seats for the disks are formed in a double base tray 60' and in two covers 30'. When the container 10' is closed, the disk seats are designed so that they keep the two disks in each compartment from touching each other. Though this container 10' is much more economical to manufacture than the multi-disk box-like containers described above, it is limited to storing four or fewer disks 14 and is inefficient when three or fewer disks are stored in the four disk containers 10'. Therefore, it is not readily and easily adaptable to the addition or subtraction of disks to the container 10'.

As shown in FIGS. 35 and 36, the containers 10' similar to that described in the Brandt patent appear to be more efficient than those described above. Such containers 10' are designed to allow the user to add or remove storage compartments as needed. The container 10' shown in FIG. 35, for example, is a zig-zag arrangement including covers 30' a double base tray 60' and intermediate carriers also known as dual trays 70'. One side of the dual tray 70' acts as a cover 30' and the other side acts as a base tray 50'. The dual trays 70' are hingedly connected to opposite edges of the double base tray 60' and the covers 30' are hingedly connected on opposite edges of the dual tray 70' such that a zig zag or accordion shape is created within the container 10'.

Referring to FIG. 36, two covers 30' may also be formed back-to-back to form a double cover 40' which may be hingedly connected to opposite ends of the double base tray 60' to form a zig zag configuration.

For both of the above multiple compartment containers, when the desired number of compartments have been formed, the two end compartments are enclosed with covers 30'. A disadvantage of the above zig zag configurations is that opening only a desired one of their compartments is somewhat inconvenient because of the alternate side hinging. Moreover, allowing the units to open up completely as illustrated in FIGS. 35 and 36 is believed to be undesirable.

SUMMARY OF THE INVENTION

It has previously been established that a need exists for a container for storing multiple objects, such as mini-disk cartridges. However, a further need exists for such a container, which is stable and easily adaptable to the number of objects needed to be stored. These and other objects are achieved by the container of the present invention by incorporating some or all of the following five components including a double base tray, a double cover, a dual tray, a base tray, and a cover into an expandable storage container system.

All five of the components should have hinge elements located at their rear portions such that all connections between components are made at the rear of the expandable container. Further, as would be expected, base tray portions of a double base tray, dual tray, and base tray should be mated with cover portions of a double cover,-dual tray, or cover to form complete enclosures. Therefore, allowing the user to employ any of the five components as needed to expand the container makes the present invention extremely efficient and user friendly. Also, by mating all of the components at their rear portions, this expandable storage container system is more stable than the prior art container systems.

The preferred embodiment of this expandable container is contingent on the number of objects (e.g. mini-disk cartridges) that need to be stored. For the storage of one object, any base tray and cover that may be hingedly connected at their rear portions may be utilized to form a single compartment container. The base tray and the correspondingly fitting cover may have dimensions, elements, and features similar to those of any base tray and cover used for the storage of one object, such as containers for the storage of a mini-disk cartridge or a standard compact disk.

Though the hinge connection allowing the cover to pivot relative to the base tray is important, the hinged connection may take many forms. An example of one such hinge connection is a circular depression in the outer rear side portions of the base tray matingly engaged with corresponding cylindrical protrusions in the inner rear side portions of the cover. In another example, the protrusions may be formed on the inner rear side portions of the base tray and the depressions may be formed in the outer rear side portions of the cover. Nonetheless, the protrusion/depression hinge combination, as well as any other similar hinge connection, may be utilized as long as the hinge connection allows the cover to pivot such that it may be used to open and close the container.

For the storage of two objects, a double base tray, a double cover, or a dual tray may be incorporated into the system to form additional compartments. These components may utilize any existing base tray and cover combination, as long as the base tray and cover are hingedly connected at their rear side portions, and both the base tray and cover have substantially flat outer bottom and top surfaces respectively.

The double base tray consists of two base trays, an upper base tray and a lower base tray, molded back-to-back or with a common wall such that their rears, fronts, and corresponding side edges match up. Any cover which hingedly connects to either the upper base tray or the lower base tray to form an enclosed compartment may be employed to enclose the top and bottom of the container.

The individual covers are each pivotally connected at the rear end of the upper base tray and the lower base tray respectively as described for the storage of one object. However, for most uses of this container, only the cover for the base tray with its interior facing upward should be opened. This prevents the object enclosed in the base tray with its interior facing downward from falling out when opened. To open the cover for the base tray with its interior facing downward, both covers should be in the closed position. Next, the container should be turned over so that the base tray whose interior faced downward is facing upward. Now, the cover corresponding to the base tray whose interior is facing upward may be opened.

The double cover consists of two covers, an upper cover and a lower cover, molded back-to-back or with a common wall such that their rears, fronts, and corresponding side edges match up. Any base tray which hingedly connects to either the upper cover or the lower cover to form an enclosed compartment may be utilized to enclose the top and bottom of the container.

The individual base trays are each pivotally connected at the rear end of the upper cover and the lower cover respectively as described for the storage of one disk. However, for most uses of this container only the cover for the base tray with its interior facing upward should ever be opened. This prevents the object enclosed in the base tray with its interior facing downward from fallout when opened. To open the cover for the base tray with its interior facing downward, both covers should be in their closed position. Next, the container should be turned over so that the base tray whose interior faced downward is facing upward. Now, the cover corresponding to the base tray whose interior is facing upward may be opened.

The dual tray consists of one base tray molded back-to-back or sharing a common wall with a cover such that their rears, fronts and corresponding sides edges match up. Any cover and any base tray which hingedly connect to the dual tray's base tray and cover respectively to form enclosed compartments, may be used to enclose the top and bottom of the container.

The dual tray's cover is pivotally connected to the rear end of the individual base tray to form a compartment, and the individual cover is pivotally connected to the rear end of the dual tray's base tray to form a compartment. The individual base tray should always be positioned as the bottom of the container.

Like the container for one object, the double base tray, the double cover, the dual tray, the individual base trays, and the individuals covers respectively may have dimensions, elements, and features similar to those of any known base tray and cover combination utilized for the storage of one object, such as a mini-disk cartridge or a standard compact disk. Since all three configurations more than adequately serve their purpose of storing two objects, the choice of which configuration to employ may be left up to the user of the container based on the application for which the container will be utilized or user preference.

For the storage of more than two objects the dual tray, the double base tray, the double cover, the individual base tray, and the individual cover as described in the previous embodiments may be utilized in many interchangeable embodiments. In one preferred embodiment, an individual cover may be pivotally connected to the base tray of a dual tray, the cover of the dual tray may be pivotally connected to the base tray of another dual tray, and the cover of the second dual tray may be pivotally connected to an individual base tray. Additional dual trays, double base trays and double covers may be pivotally connected to their respective counterparts as needed for the storage of multiple objects. Therefore, the number of compartments of the container may be easily adapted for the addition or subtraction of objects to the container.

In an alternate preferred embodiment, a individual cover may be pivotally connected to the base tray of a dual tray, the cover of the dual tray may be pivotally connected to the upper base tray of a double base tray, and the lower base tray of the double base tray may be pivotally connected to an individual cover. Additional dual trays, double base trays, and double covers may be pivotally connected to their respective counterparts as needed for the storage of multiple objects. Therefore, the number of compartments of the container may be easily adapted for the addition or subtraction of objects to the container.

In another alternate preferred embodiment, an individual cover may be pivotally connected to the upper base tray of a double base tray, the lower base tray of the double base tray may be pivotally connected to the upper cover of a double cover, and the lower cover of the double cover may be pivotally connected to an individual base tray. Additional dual trays, base trays, and double covers may be pivotally connected to their respective counterparts as needed for the storage of additional objects. Again, the number of compartments for the container can be readily adapted for the addition or subtraction of objects to the container.

In yet another alternate embodiment, an individual base tray may be pivotally connected to the cover of a dual tray, the base tray of the dual tray may be pivotally connected to the upper cover of a double cover, and the lower cover of the double cover may be pivotally connected to an individual base tray. Additional dual trays, double base trays, and double covers may be pivotally connected to their respective counterparts as needed for the storage of additional objects. In this embodiment, the number of compartments of the container may also be easily adapted to the number of objects needed to be stored in the container.

As a further clarification of the description for the previous embodiments, double base trays, double covers, and dual trays may be interchanged within one container. For these embodiments, by simply disconnecting base tray and cover portions, corresponding base tray portions may be pivotally connected with cover portions and vice-versa to form as many compartments as needed. Further, at least one individual base tray or one individual cover should be pivotally connected to the corresponding uppermost and lowermost base tray or cover portions of the container respectively to participate in forming the uppermost and lowermost compartments of the container.

In other alternate embodiments, double base trays, double covers, and dual trays may be formed with the corresponding base trays or covers formed back-to-back with different edges matching up. For example, the front edge of a cover may be matched to the rear edge of a base tray, or the side edge of a base tray may be matched up with the front edge of a base tray. For these embodiments, the other edges of the base tray and cover, base tray and base tray, or cover and cover combination formed back-to-back should approximately match up. These mismatched edge components may be utilized as described for the other embodiments of the container of this invention. The only difference being that the compartments may now be opened from different sides of the container.

This expandable container has been found to work particularly well for the storage of mini-disk cartridges and standard compact disks. When the expandable container is used for storing these particular objects, single cartridge and disk containers are usually easy to adapt because their base tray and cover components are usually easily molded back-to-back. When utilized for these purposes, the container has been found to be simple to use, stable, and easy to adapt to the addition or subtraction of cartridges and disks.

BRIEF DESCRIPTION OF THE DRAWINGS

The accompanying drawings illustrate several presently preferred but nevertheless illustrative embodiments of the invention, and serve to aid in the explanation of the principles of the invention.

FIG. 7 is a perspective view of a double cover.
FIG. 8 is a side sectional view of a double cover.
FIG. 9 is a perspective view of a dual tray.
FIG. 10 is a side sectional view of a dual tray.
FIG. 11 is an isolated exploded perspective view of a hinge which includes a depression on the base tray outer rear side wall and pivot protrusion on the cover inner rear side wall.
FIG. 14 is a an open perspective view of two covers and a double base tray forming a two compartment container.
FIG. 15 is a closed cutaway perspective view of two covers and a double base tray forming a two compartment container.

DETAILED DESCRIPTION OF ILLUSTRATIVE EMBODIMENTS

Figure 12:
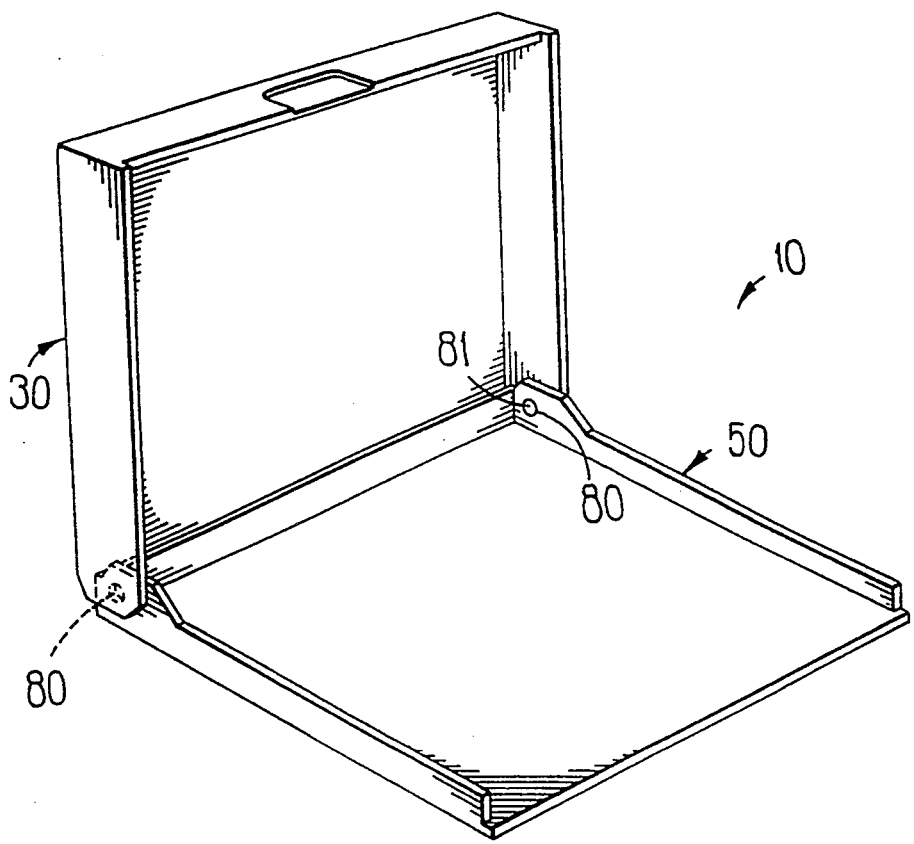
FIG. 12 is a an open perspective view of a base tray and cover forming a one compartment container.
Figure 13:
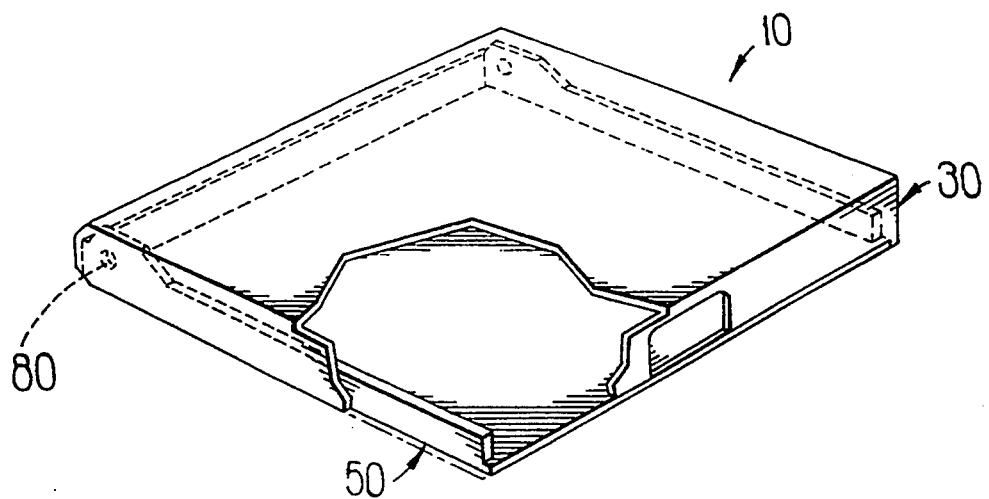
FIG. 13 is a closed cutaway perspective view of a base tray and cover forming a one compartment container.

As shown in FIGS. 1 through 10, the expandable container 10, may include any of the following five components, a base tray 50 (see FIGS. 1 and 2), a cover 30 (see FIGS. 3 and 4), a double base tray 60 (see FIGS. 5 and 6), a double cover 40 (see FIGS. 7 and 8), and a dual tray 70 (see FIGS. 9 and 10). Nonetheless, the base tray 50 and the cover 30 are the fundamental building blocks of this expandable container 10. The base tray 50 and cover 30 may be almost any known hingedly connected base tray 50 and cover 30 combination for holding a single object. In a preferred embodiment, as shown in FIGS. 12 and 13, the base tray 50 and the cover 30, should be chosen such that they securely fit together to provide an adequate enclosure for the object, while allowing easy access to it.

Figures 1, 2:
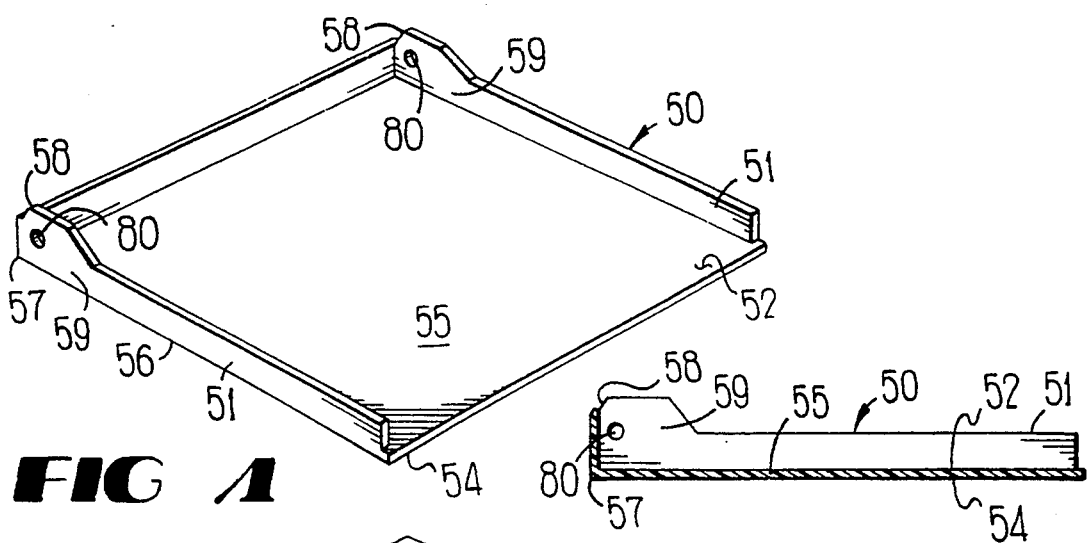
FIG. 1 is a perspective view of a base tray.
FIG. 2 is a side sectional view of a base tray.

As shown in FIGS. 1 and 2, the base tray 50 also referred to as a single base element, is preferably formed of plastic, such as polystyrene, though it may be formed of almost any other material used for containers storing objects. The base tray 50 includes a bottom surface 55, which has a bottom interior surface 52 and a bottom exterior surface 54. The bottom interior surface 52 can incorporate the features of almost any container for storing objects, while the bottom exterior surface 54 should be flat.

The bottom surface 55 has two side edges 56, which are substantially parallel, at least in the rear portion of the bottom surface 55, and are connected by a rear edge 57. Extending perpendicularly upward from, at least the rear portion of, each side edge 56 is a side wall 51, which includes a rear side wall portion 59. The corners 58 of the rear side wall portions 59 may be angled or beveled.

A hinge element having a first configuration 80, should be formed into each rear side wall 59. For example, in this illustration the first configuration 80 includes a circular depression 53 (see FIG. 11), which has been formed into the exterior of the rear side wall portion 59.

Figures 3, 4:
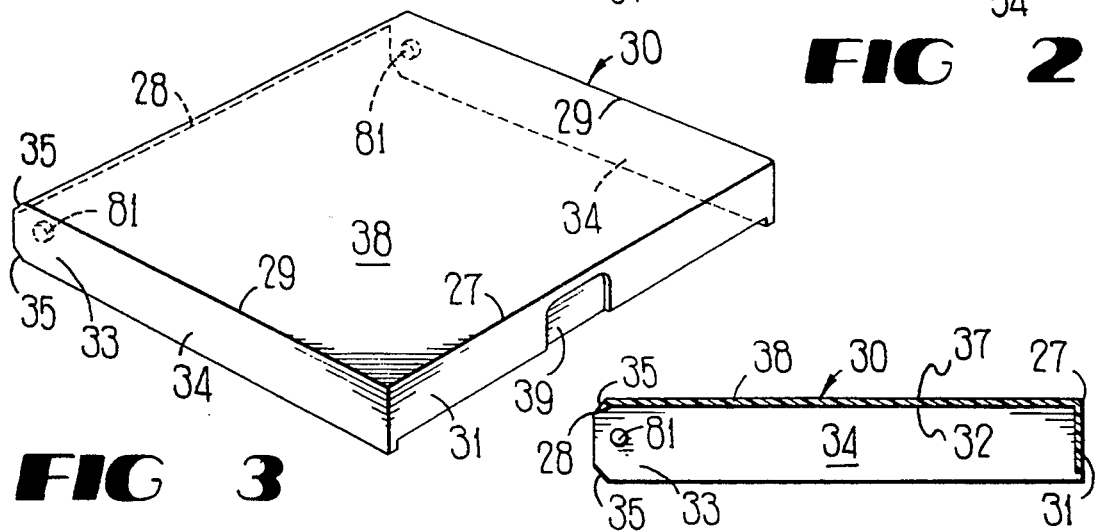
FIG. 3 is a perspective view of a cover.
FIG. 4 is a side sectional view of a cover.

As shown in FIGS. 3 and 4, the cover 30, also referred to as a single cover element, is also preferably formed of plastic, such a polystyrene, though it may be formed of almost any other material utilized for containers storing objects. The cover 30 includes a top surface 38, which has a top interior surface 32 and a top exterior surface 37. The top interior surface 32 can incorporate the features of almost any container for storing objects, while the top exterior surface 37 should be flat. In this illustration additional features relative to the top interior surface 32 include a front wall 31, which extends perpendicularly downward from the front edge 27 of the cover's top interior surface 32, and a finger grip 39, which is centered on the exterior of the front wall 31.

The top surface 38 has two side edges 29, which are substantially parallel, at least in the rear portion of the top surface 38, and are connected by a rear edge 28. Extending perpendicularly downward from, at least the rear portion of, each side edge 29 is a side wall 34, which includes a rear side wall portion 33. The corners 35 of the rear side wall portions 33 may be angled or beveled.

A hinge element having a second configuration 81 corresponding and complimentary to the first configuration 80 of the base tray 50 should be formed into each rear side wall 33. For example, in this illustration the second configuration 81 includes a cylindrical protrusion 36 (see FIG. 11) which has been formed to the interior of the rear side wall portion 33.

Figures 5, 6:
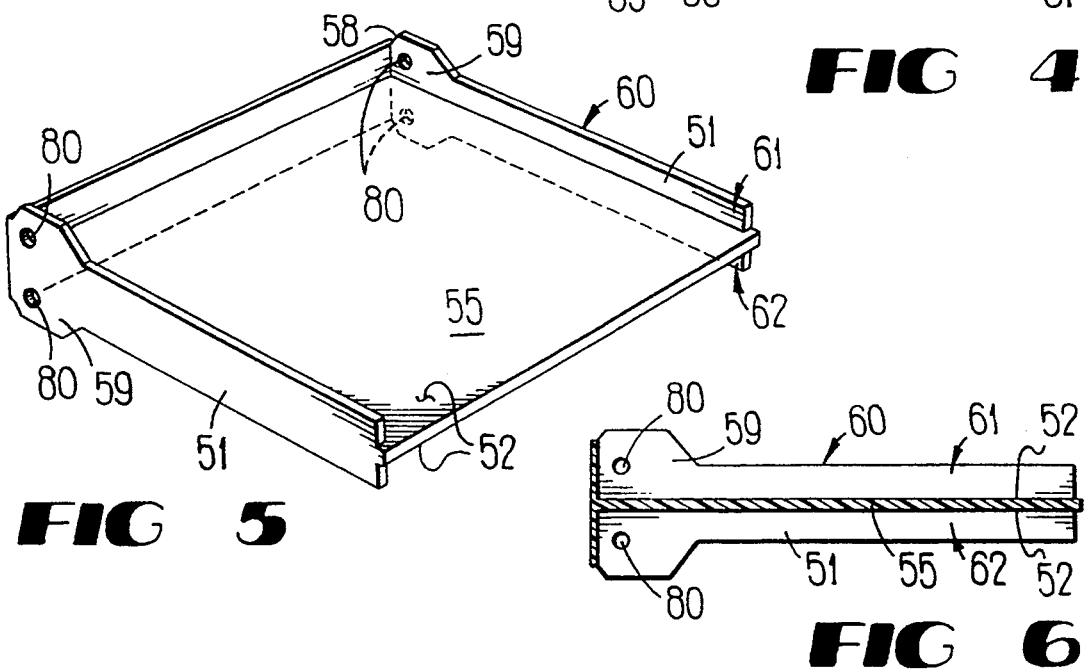
FIG. 5 is a perspective view of a double base tray.
FIG. 6 is a side sectional view of a double base tray.

As shown in FIGS. 5 and 6 a double base tray 60, also referred to as a double base element, may be constructed by forming two base tray's 50 (see FIGS. 1 and 2) back-to-back such that their exterior bottom surfaces 54 are mated together. The two base trays 50 may also be formed with a common wall for the bottom surface 55 of each base tray 50. The two base trays 50 are known as the upper base tray 61 and the lower base tray 62. In a preferred embodiment, the rear edges 57 and corresponding side edges 56 of the upper base tray 61 and the lower base tray 62 should align such that the exterior bottom surface 54 of the upper base tray 61 substantially overlaps the exterior bottom surface 54 of the lower base tray 62. The corners 58 of the rear side walls 59 may need to be beveled or angled to allow for adequate rotation of the upper and lower base trays 61 and 62 respectively and other components of the container 10.

As shown in FIGS. 7 and 8, a double cover 40, also referred to as a double cover element, may be fashioned by forming two covers 30 (see FIGS. 3 and 4) back-to-back such that their exterior top surfaces 37 are mated together. The two covers 30 may also be formed with a common wall for the top surface 38 of each cover 30. The two covers 30 are known as the upper cover 43 and the lower cover 44. In a preferred embodiment, the rear edges 28 and corresponding side edges 29 of the upper cover 43 and the lower cover 44 should align such that the exterior top surface 37 of the upper cover 43 substantially overlaps the exterior top surface 37 of the lower cover 44. The corners 35 of the rear side walls 33 may need to be beveled or angled to allow for adequate rotation of the upper and lower covers 43 and 44 respectively and other components of the container 10.

As shown in FIGS. 9 and 10, a dual tray 70, also referred to as a combined element, may be constructed by forming a base tray 50 (see FIGS. 1 and 2), known as a dual tray base tray 76, and a cover (see FIGS. 3 and 4) known as a dual tray cover 77, back-to-back such that the exterior surface 54 of the base tray 50 is mated with the exterior surface 37 at the cover 30. The base tray 50 and cover 30 may also be formed with a common wall for the bottom surface 55 of the base tray 50 and the top surface 38 of the cover 30. In a preferred embodiment, the rear edge 57 of the dual tray base tray 76 should align with the rear edge 28 of the dual tray cover and the side edges 56 of the dual tray base tray 76 should align with the corresponding side edges 29 of the dual tray cover 77 such that the exterior bottom surface 54 of the dual tray base tray 76 substantially overlaps the exterior top surface 37 of the dual tray cover 77. The corners 58 of the rear side walls 59 of the dual tray base tray 76 and/or the corners 35 of the rear side walls 33 of the dual tray cover 77 may need to be beveled or angled to allow for adequate rotation of the base tray 76 and cover 77, as well as other components of the container 10. As in forming each compartment of this expandable storage container system, the first hinge element 80 in each rear side wall 59 of the base tray 50 with the complimentary second hinge element B1 in each rear side wall 33 of the cover 30.

These components (the base tray 50, the cover 30, the double base tray 60, the double cover 40, an dual tray 70) may each be utilized to form compartments in the expandable container 10 of the present invention. Moreover, the components may be interchanged to form containers 10 having a varying number of compartments.

As shown in FIGS. 12 and 13, the base tray 50 an cover 30 may be hingedly connected a their corresponding rear portions to form a single compartment container 10. In the same way that each compartment of this expandable storage container system is formed, the first configuration 80 of the hinge element of the base tray 50 is pivotally connected to the second configuration 81 of the hinge element of the cover 30.

As shown in FIGS. 14 an 15, a two compartment container 10 may be formed utilizing a double base tray 60. For this embodiment, a cover 30 is hingedly connected to the upper base tray 61 to form a first compartment, an another cover 30 is hingedly connected to the lower base tray 62 to form a second compartment.

Figure 16:
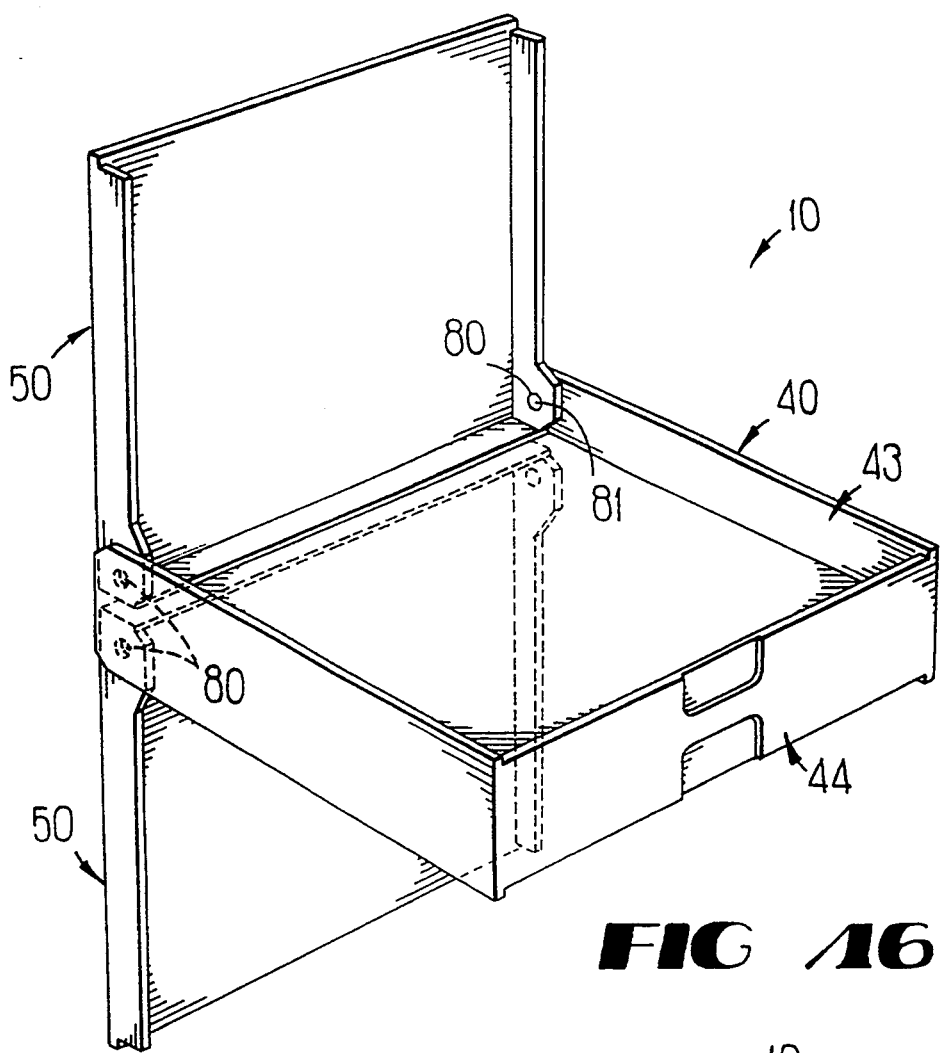
FIG. 16 is a an open perspective view of two base trays and a double cover forming a two compartment container.
Figure 17:
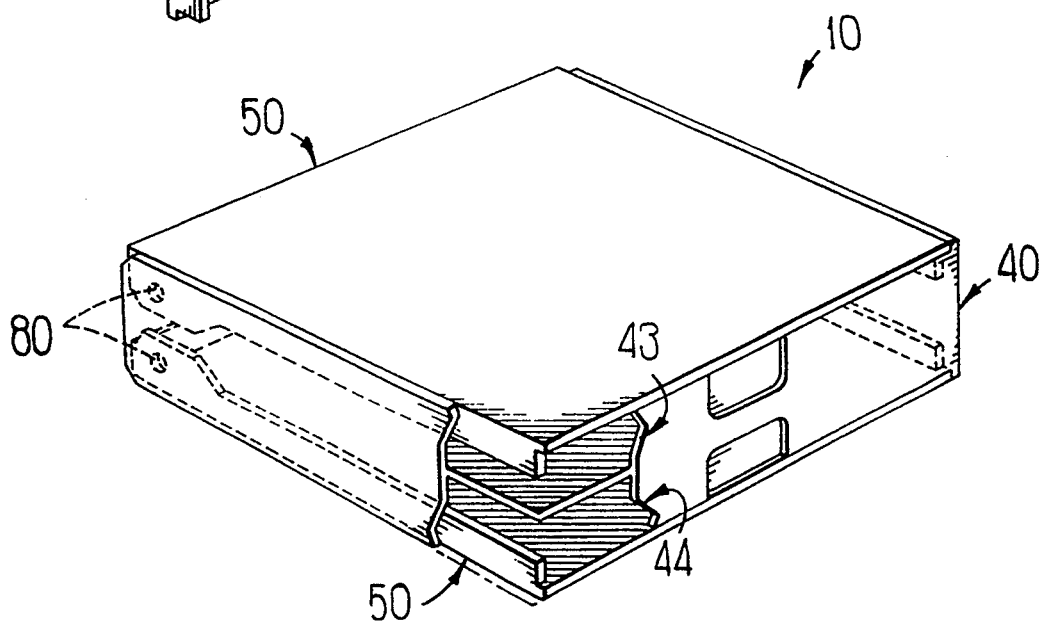
FIG. 17 is a closed cutaway perspective view of two base trays and a double cover forming a two compartment container.

As shown in FIGS. 16 and 17, a two compartment container 10 may also be constructed by employing a double cover 40. For this embodiment, a base tray 50 is hingedly connected to the upper cover 43 to form a first compartment, and another base tray 50 is hingedly connected to the lower cover 44 to form a second compartment.

Figure 18:
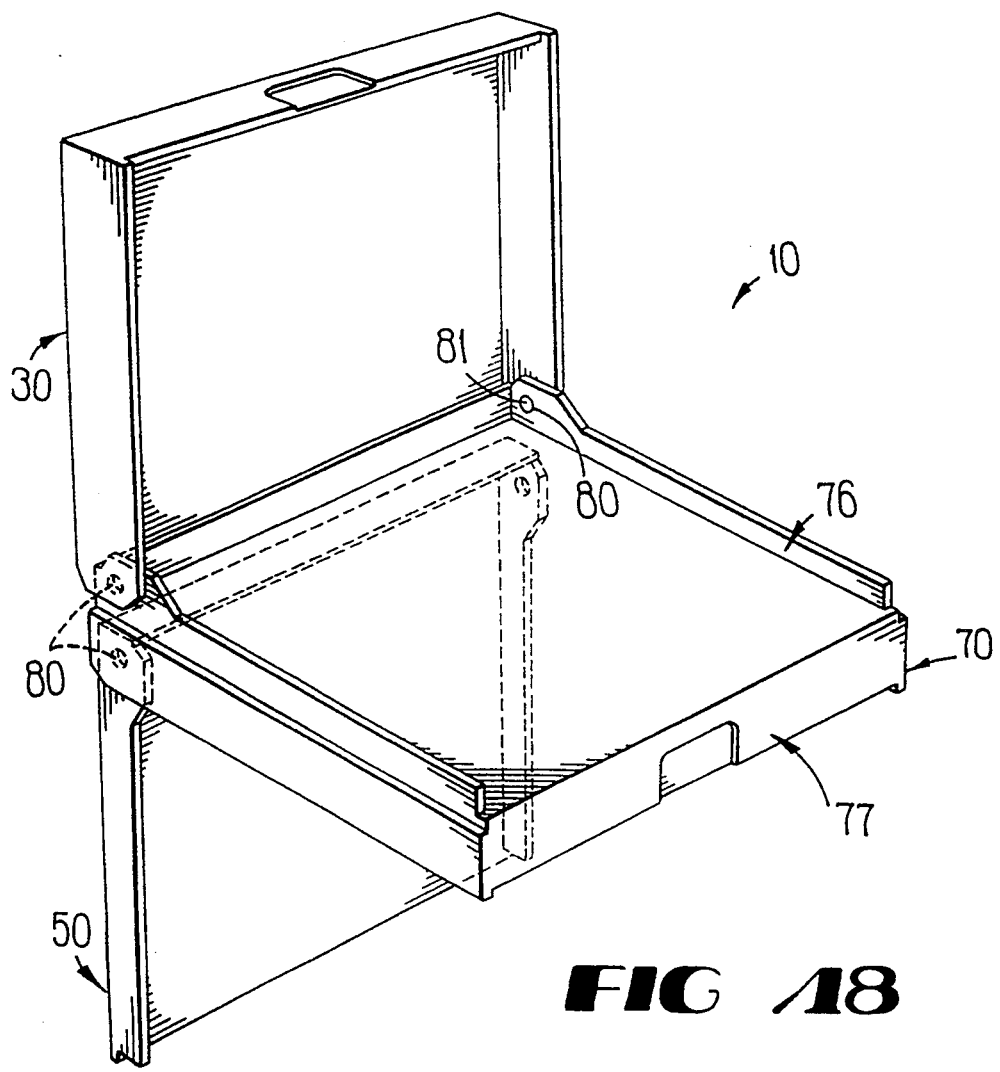
FIG. 18 is a an open perspective view of a base tray, a cover, and a dual tray forming a two compartment container.
Figure 19:
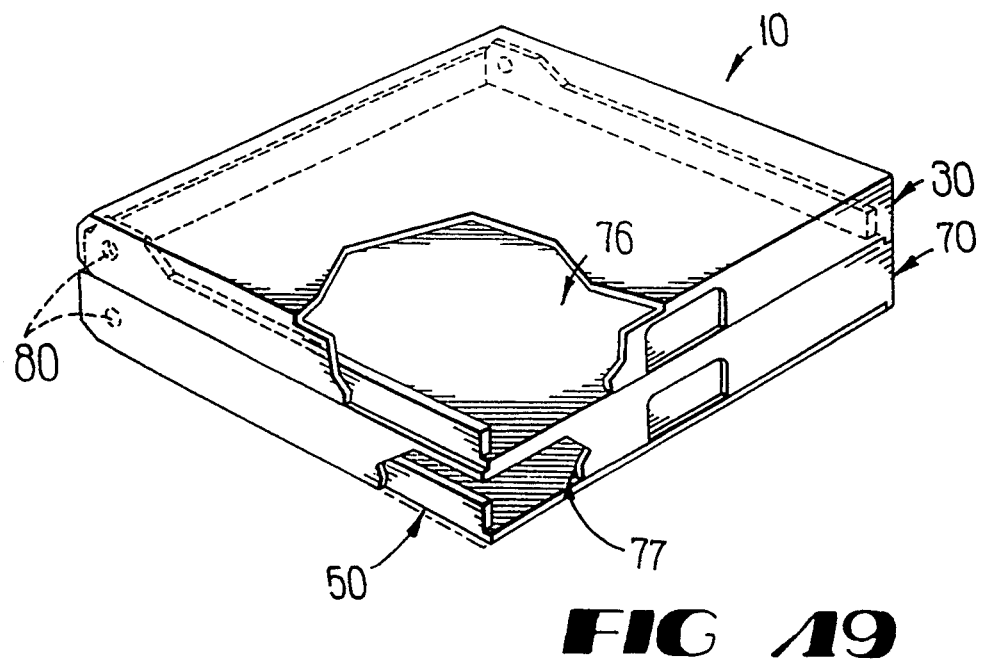
FIG. 19 is a closed cutaway perspective view of a base tray, a cover, and a dual tray forming a two compartment container.

As shown in FIGS. 18 and 19, a two compartment container may also be fashioned utilizing a dual tray 70. For this embodiment, a cover 30 is hingedly connected to the dual tray base tray 76 to form a compartment, and a base tray 50 is hingedly connected to the dual tray cover 77 to form a second compartment.

Figure 20:
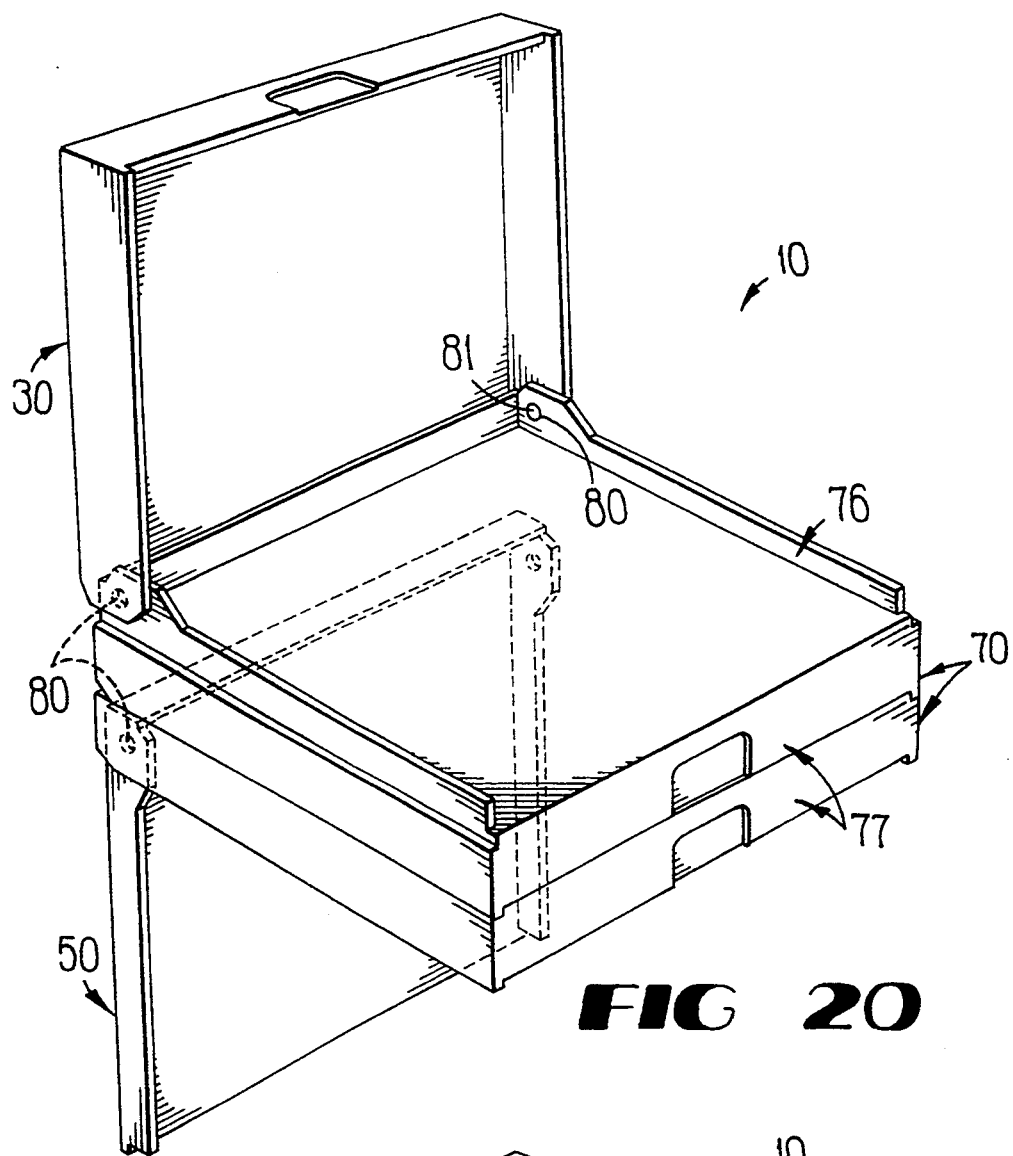
FIG. 20 is an open perspective view of a base tray, a cover, and two dual trays forming a three compartment container.
Figure 21:
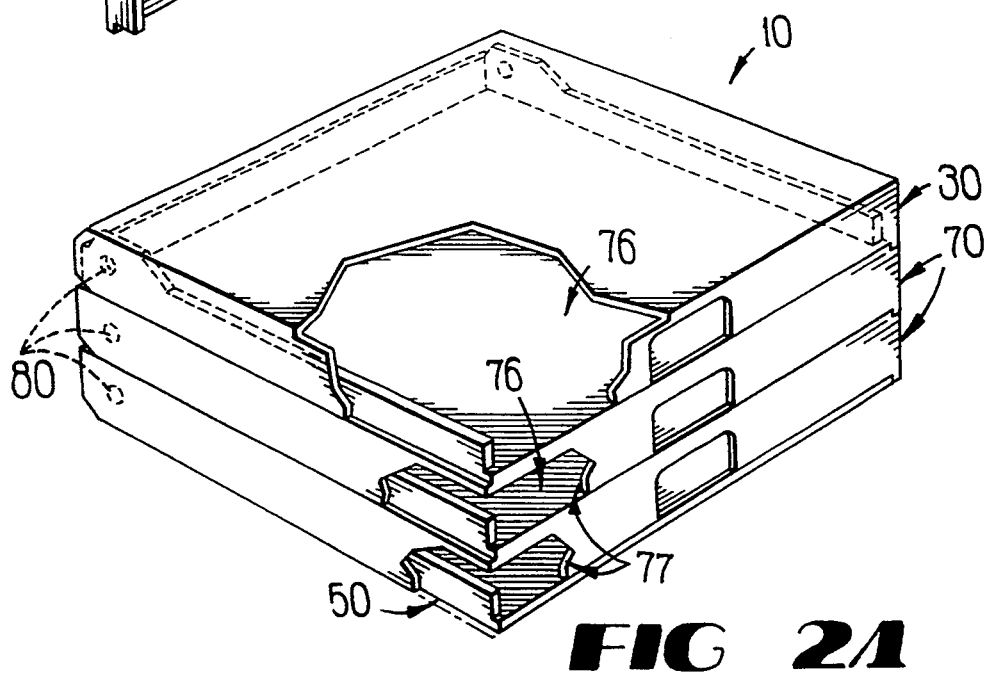
FIG. 21 is a closed cutaway perspective view of a base tray, a cover, and two dual trays forming a three component container.

As shown in FIGS. 20 and 21, a three compartment container 10 may be formed by employing a cover 30, two dual trays 70, and a base tray 50. The cover 30 is hingedly connected to the first dual tray's base tray 76 to form a first compartment. The first dual tray's cover 77 is hingedly connected to the second dual tray's base tray 76 to form a second compartment. Finally, a base tray 50 is hingedly connected to the second dual tray's cover 77 to form a third compartment.

Figure 22:
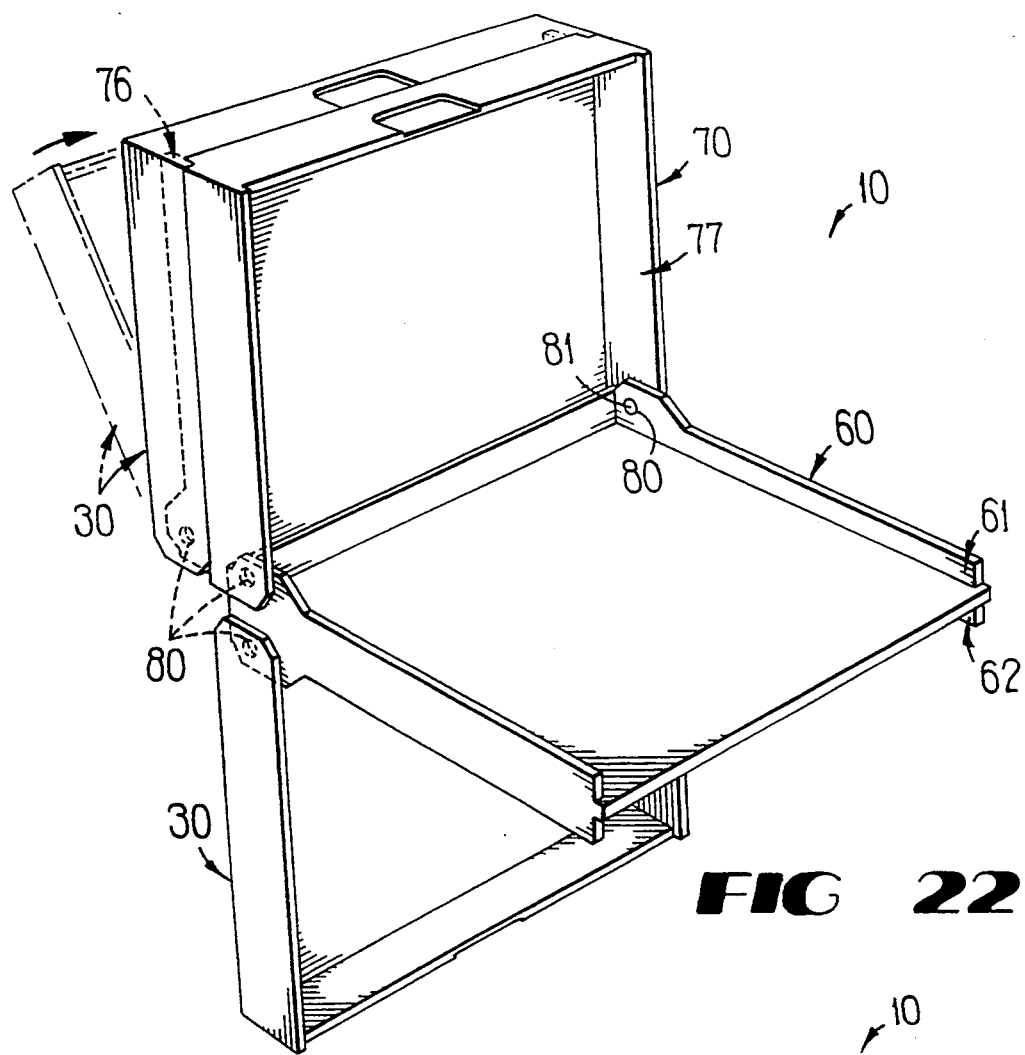
FIG. 22 is an open perspective view of two covers, a dual tray, and a double base tray forming a three compartment container.
Figure 23:
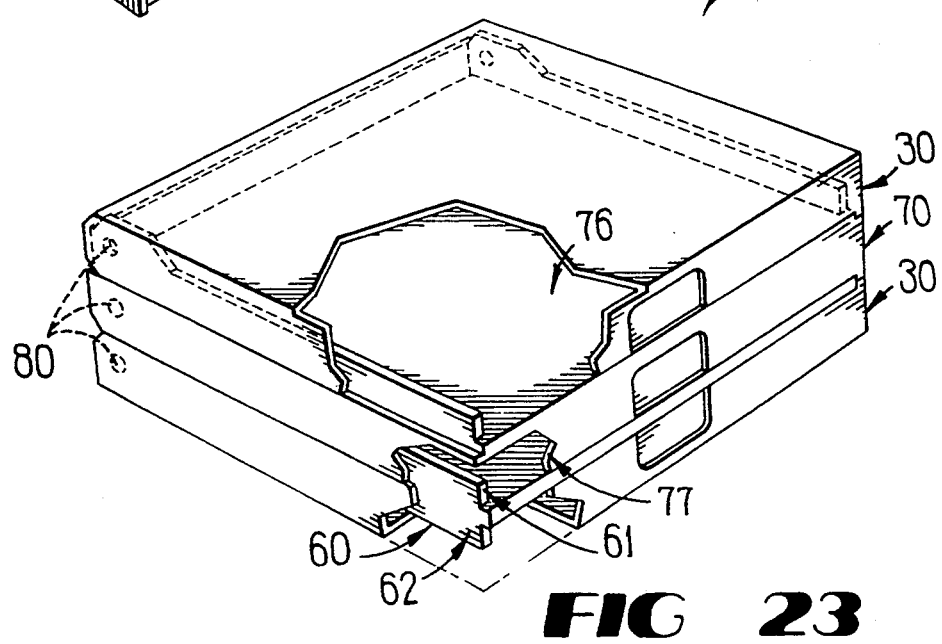
FIG. 23 is a closed cutaway perspective view of two covers, a dual tray, and a double base tray forming a three compartment container.

As shown in FIGS. 22 and 23, a three component container 10 may be formed by utilizing two covers 30, a dual tray 70 and a double base tray 60. The first cover 30 is hingedly connected to the dual tray's base tray 76 to form a first compartment. The dual tray's cover 77 is hingedly connected to the double base tray's upper base tray 61 to form a second compartment. Finally, the double base tray's lower base tray 62 is hingedly connected to the second cover 30 to form a third compartment.

Figure 24:
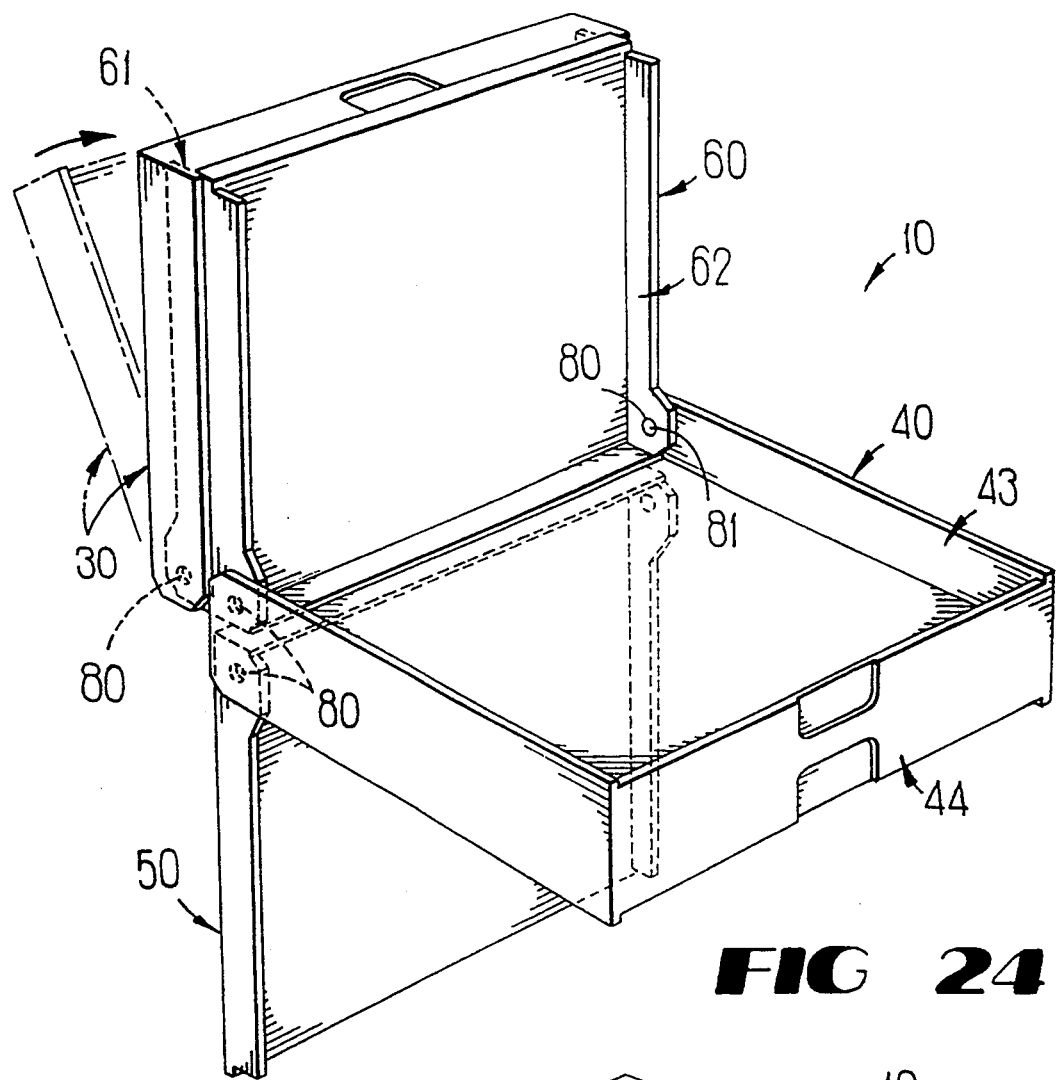
FIG. 24 is an open perspective view of a base tray, a cover, a double base tray, and a double cover forming a three compartment container.
Figure 25:
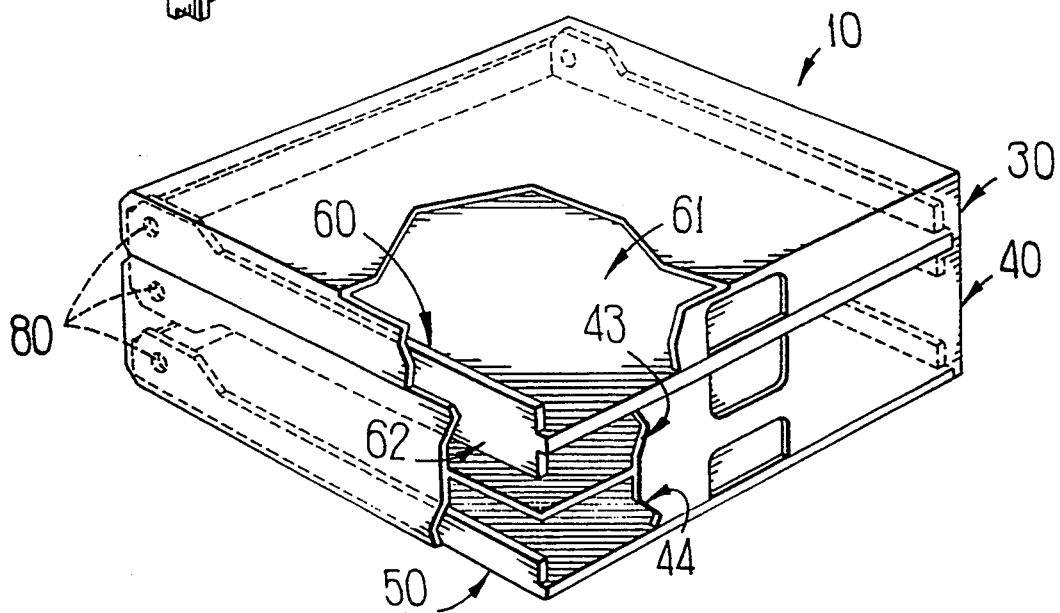
FIG. 25 is a closed cutaway perspective view of a base tray, a cover, a double base tray, and a double cover forming a three compartment container.

As shown in FIGS. 24 and 25, a three component container may also be constructed by employing a cover 30, a double base tray 60, a double cover 40, and a base tray 50. The cover 30 is hingedly connected to the double base tray's upper base tray 61 to form a first compartment. The double base tray's lower base tray 62 is hingedly connected to the double cover's upper cover 43 to form a second compartment. Finally, the double cover's lower cover 44 is hingedly connected to the base tray 50 to form a third compartment.

Figure 26:
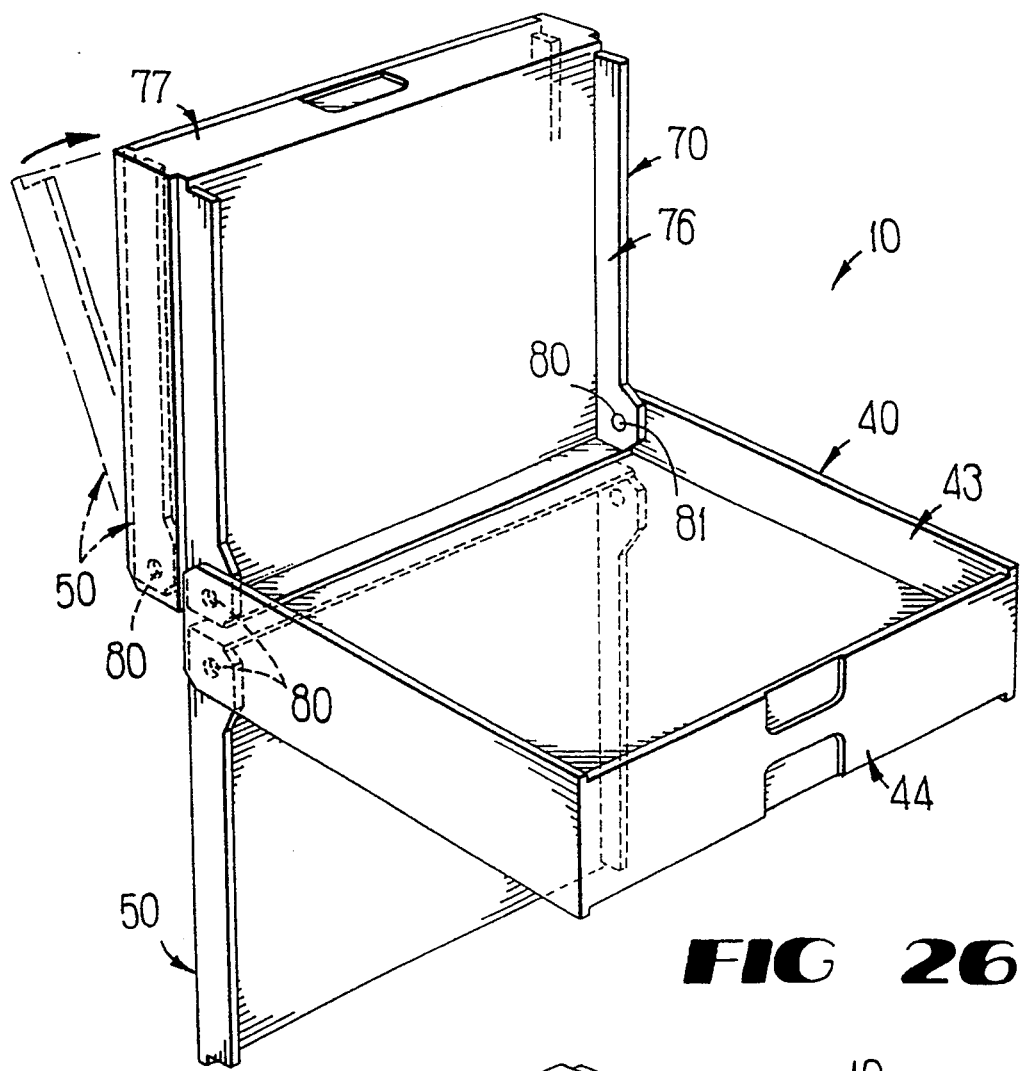
FIG. 26 is an open perspective view of two base trays, a dual tray, and a double cover forming a three compartment container.
Figure 27:
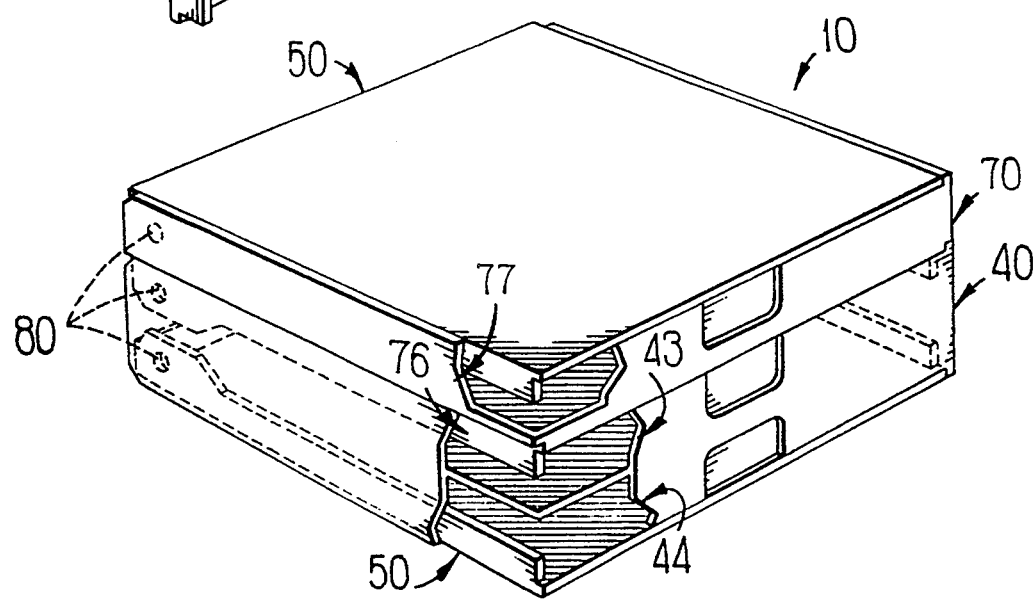
FIG. 27 is a closed perspective view of two base trays, a dual tray, and a double cover forming a three compartment container.

As shown in FIGS. 26 and 27, a three compartment container may also be fashioned by utilizing two base trays 50, a dual tray 70, and a double cover 40. The first base tray 50 is hingedly connected to the dual tray's cover 77 to form a first compartment. The dual tray's base tray 76 is hingedly connected to the double cover's upper cover 43 to form a second compartment. Finally, the double cover's lower cover 44 is hingedly connected to the second base tray 50 to form a third compartment.

The one, two, and three compartment containers discussed in the previous illustrative embodiments represent the most basic combinations of components used to form compartments within the expandable container 10. Accordingly, as stated earlier, the expandable container 10 may have many more additional compartments added as needed. To form additional compartments, components may be disconnected at their hinge elements 80, and double base trays 60, double covers 40, and dual trays 70 may be added to the previously discussed three compartment embodiments as required by the user of the container 10. The only aspects for consideration by the user are assuring that the base tray portions 61, 62 and 76 are reconnected to cover portions 43, 44 and 77 and that the uppermost compartment and lowermost compartment is completed with a base tray 50 or cover 30 based on the requirements of the container 10.

Figure 28:
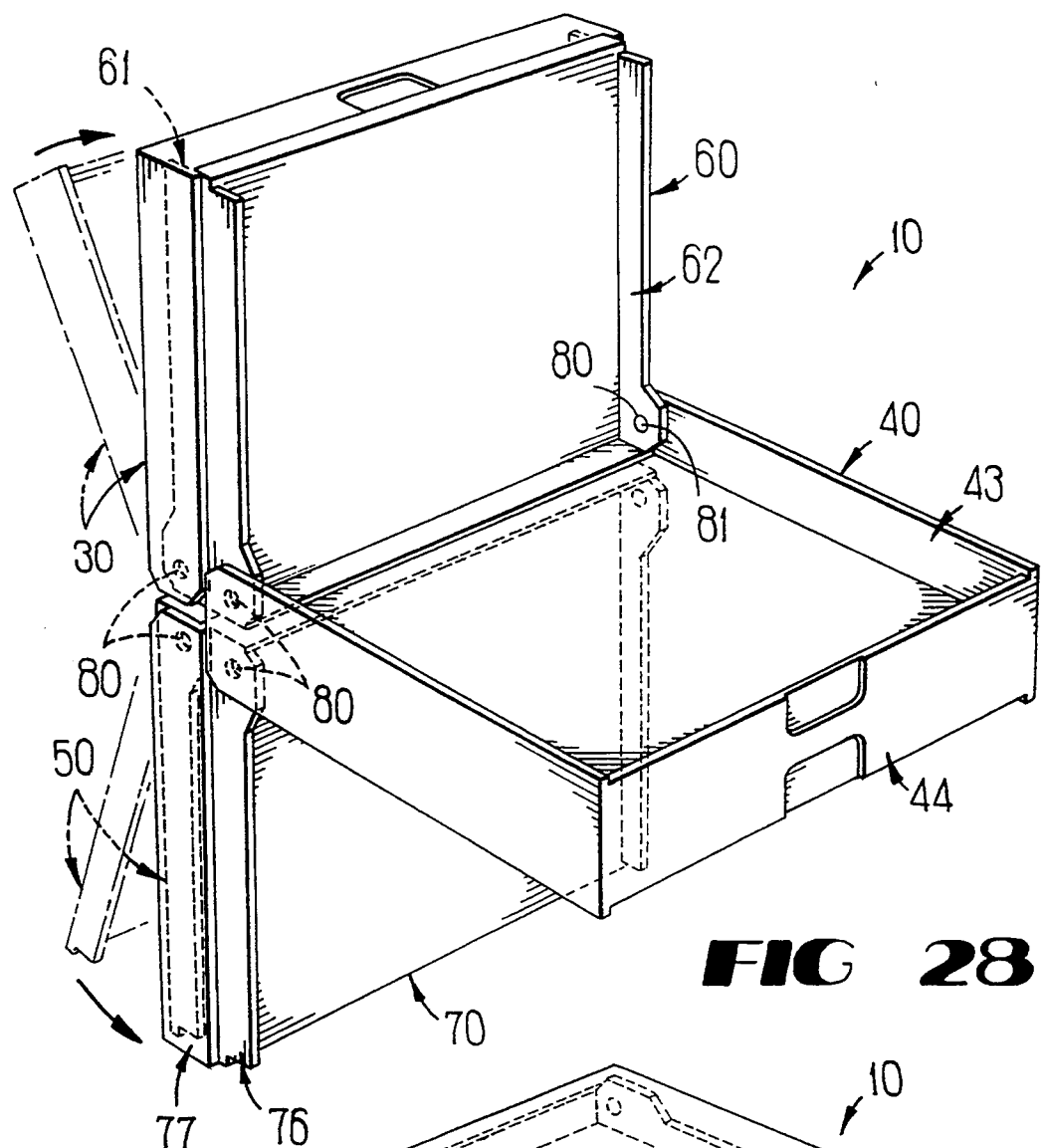
FIG. 28 is an open perspective view of a base tray, a cover, a double base tray, a double cover, and a dual tray forming a four compartment container.
Figure 29:
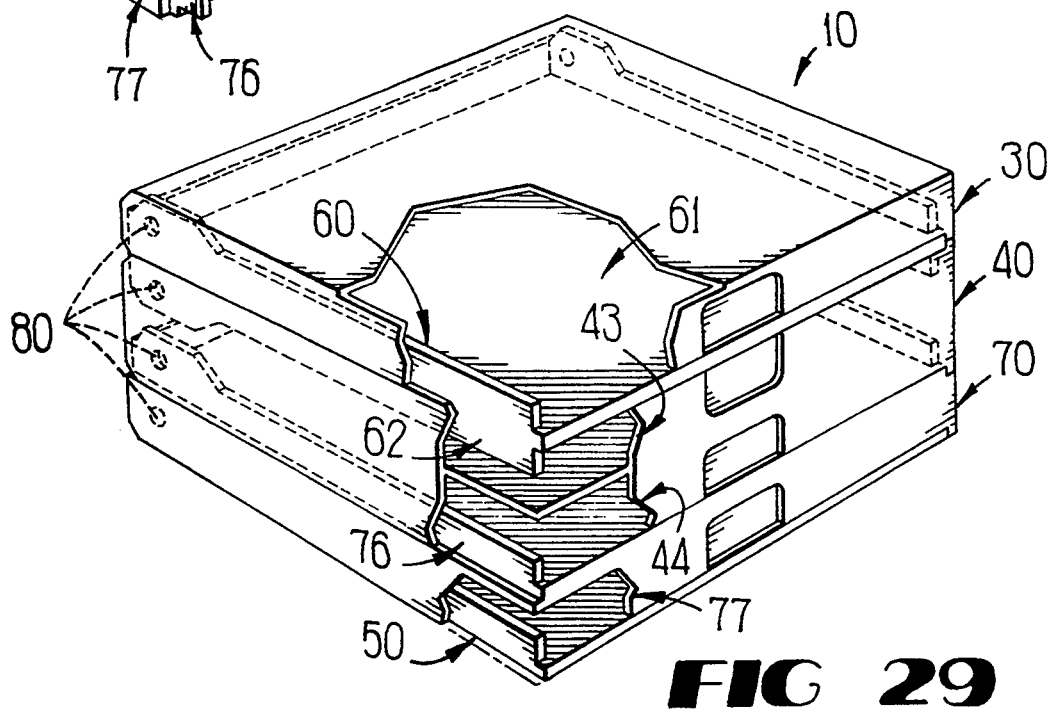
FIG. 29 is a closed cutaway perspective view of a base tray, a cover, a double base tray, a double cover, and a dual tray forming a four compartment container.

An example of a four compartment container is shown in FIGS. 28 and 29. This embodiment illustrates how all five components, including a cover 50, a double base tray 60, a double cover 40, a dual tray 70, and a base tray 50, may be utilized. The cover 50 is hingedly connected to the double base tray's upper base tray 61 to form a first compartment, and the double base tray's lower base tray 62 is hingedly connected to a double cover's upper cover 43 to form a second compartment. Also, the double cover's lower cover 44 is hingedly connected to the dual tray's base tray 76 to form a third compartment, and the dual tray's cover 77 is hingedly connected to the base tray 50 to form a fourth compartment.

Figure 30:
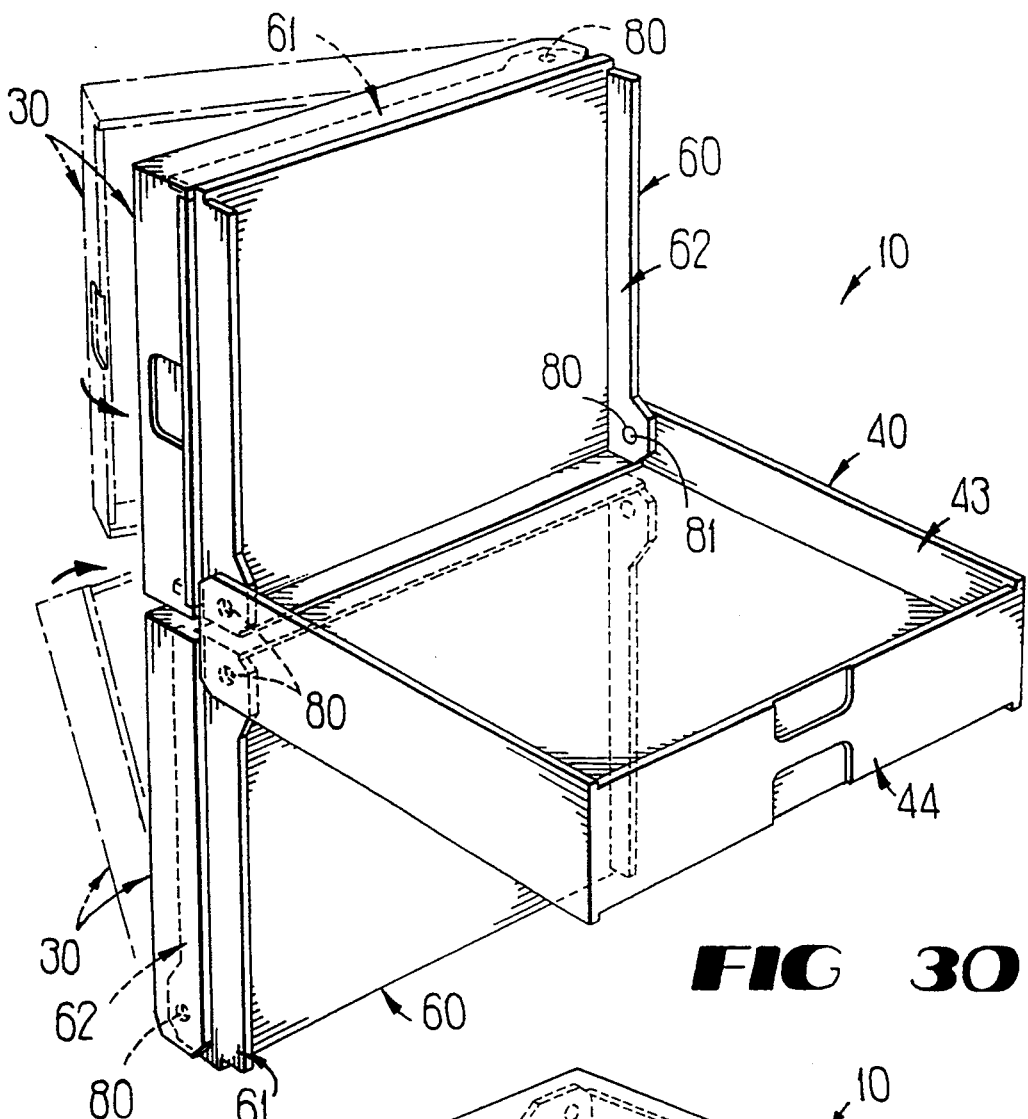
FIG. 30 is an open perspective view of two covers, a double cover, a double base tray with a 90 degree offset, and a double base tray with a 180 degree offset forming a four compartment container.
Figure 31:
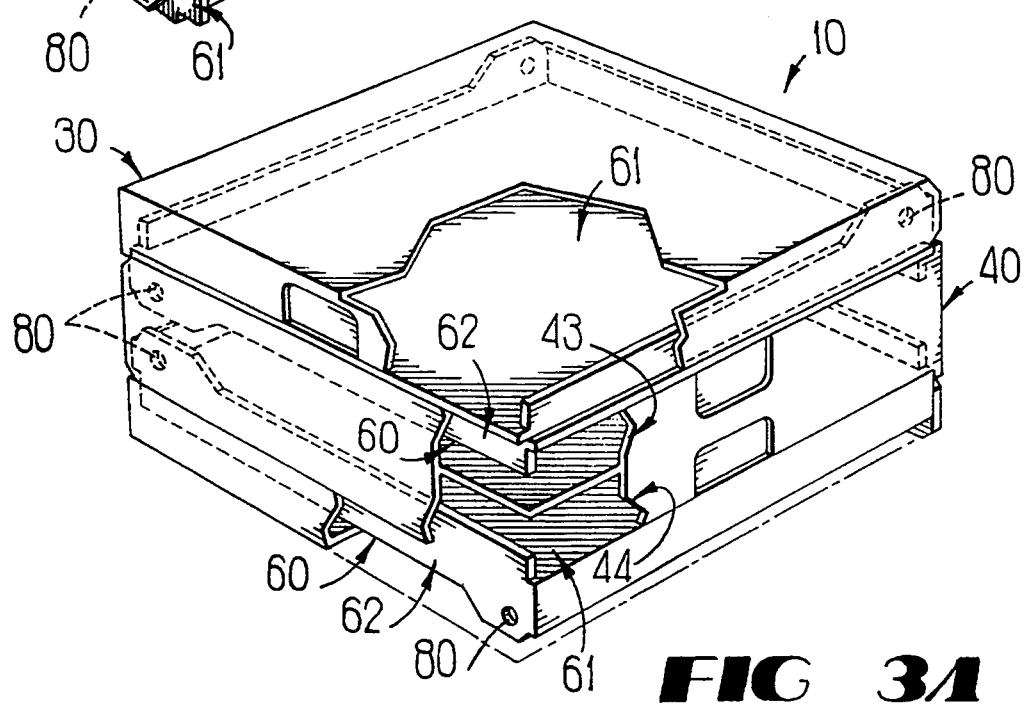
FIG. 31 is a closed cutaway perspective view of two covers, a double cover, a double base tray with a 90 degree offset, and a double base tray with a 180 degree offset forming a four compartment container.

The double base trays 60, the double covers 40, and dual trays 70 may also be formed with the rear edges 57 and 28 and corresponding side edges 56 and 29 offset by 90 degrees and 180 degrees. As shown in FIGS. 30 and 31, a double base tray with the upper base tray 61 offset 90 degrees relative to the lower base tray 62 and a double base tray with the upper base tray 61 offset 180 degrees relative to the lower base tray 62 may be utilized. In this illustrative embodiment, a cover 30 is hingedly connected to the 90 degree offset double base tray's upper base tray 61 to form a first compartment, and the double base tray's lower base tray 62 with the 90 degree offset upper base tray 61 is hingedly connected to the double cover's upper cover 43 offset zero degrees (the standard configuration) to form a second compartment. The double cover's lower cover 44 is hingedly connected to the 180 degree offset double base tray's upper base tray 61 to form a third compartment, and the double base tray's lower base tray 62 with the 180 degree offset upper base tray 61 is hingedly connected to a to a second cover 30 to form a fourth compartment.

Figure 32:
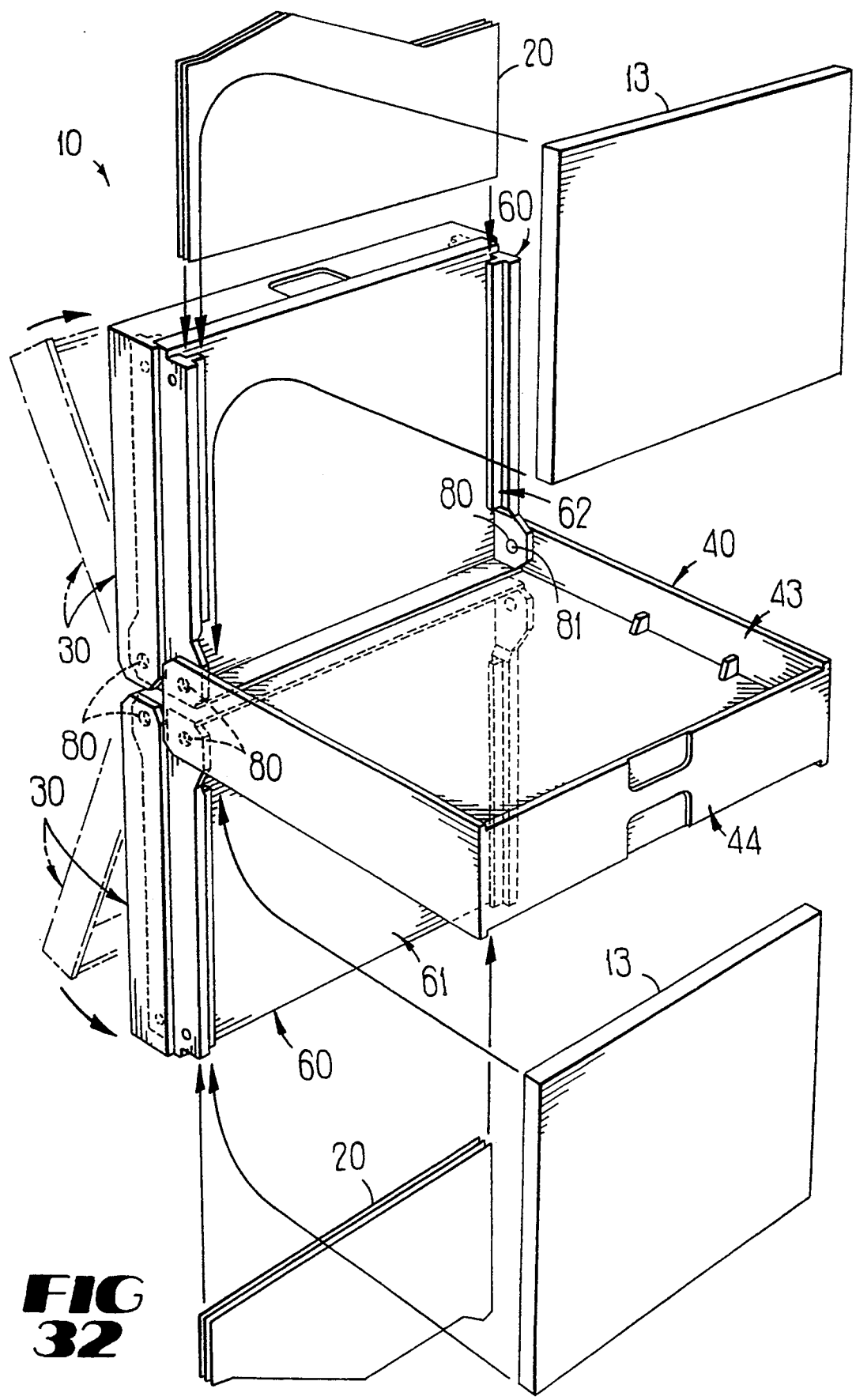
FIG. 32 is an open perspective view of two covers, two double base trays, and a double cover forming a four compartment container for storing mini-disk cartridges and promotional booklets.
Figure 33:
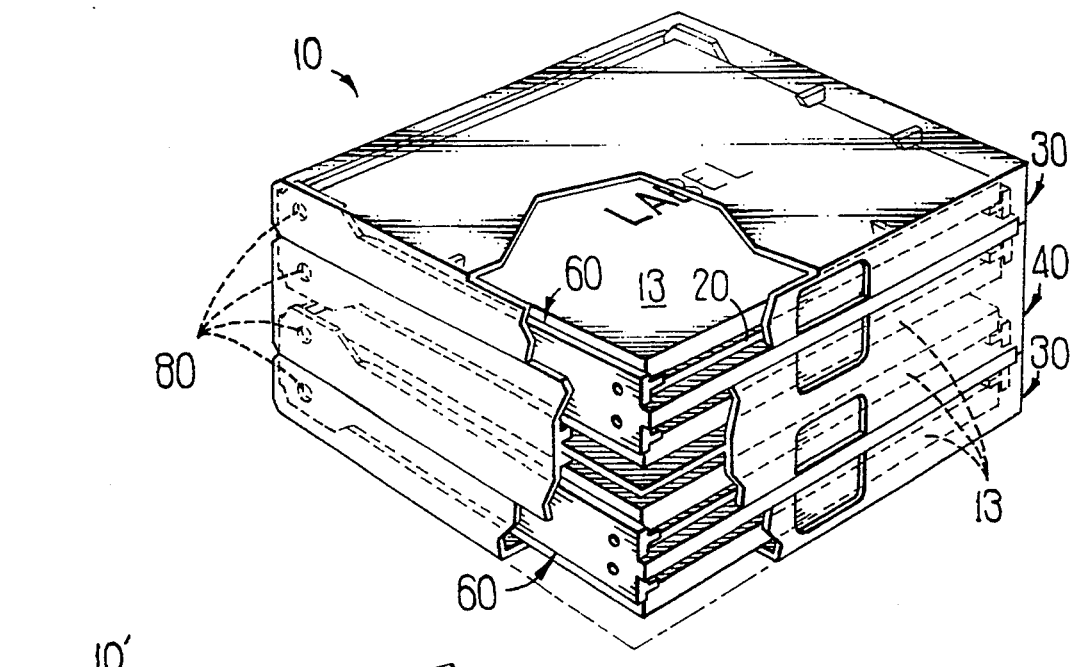
FIG. 33 is a closed cutaway perspective view of two covers, two double base trays and a double cover forming a four compartment container for storing mini-disk cartridges and promotional booklets.
Figure 34:
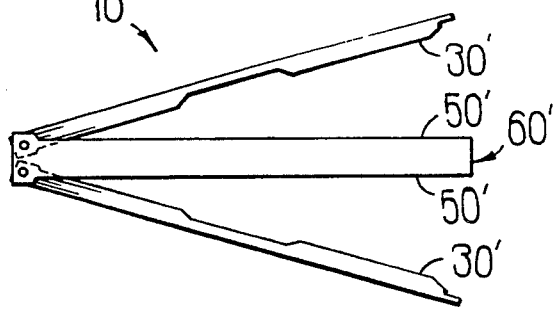
FIG. 34 is an open perspective view of a prior art multiple compartment storage container.
Figure 35:
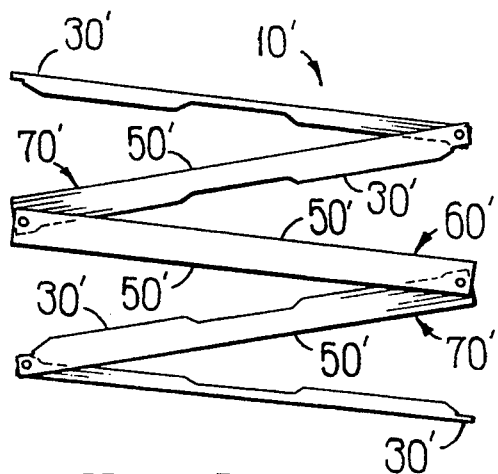
FIG. 35 is an open perspective view of a prior art multiple compartment storage container.
Figure 36:
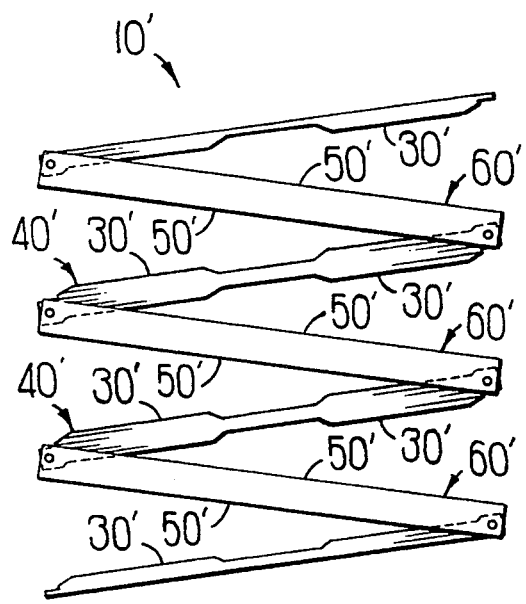
FIG. 36 is an open perspective view of a prior art multiple compartment storage container.

The expandable container 10 may be utilized for the storage of a vast number of objects, including mini-disk cartridges and standard compact disks, and booklets. Therefore, many interior features for the base tray portion 50, 61, 62 and 76, as well as the cover portions 30, 43, 44 and 77, may be incorporated into the expandable container 10. For example, as shown in FIGS. 32 and 33, a double base tray's base tray 61 and 62 and double cover's cover 43 and 44 may have interior features to allow storage for mini-disk cartridges 13 and promotional booklets or cards 20.

I claim:

1. A system for assembling a storage container having multiple compartments, said system comprising:
    a double base element including;
        a substantially rectangular base having top and bottom planar surfaces,
        a double base rear wall disposed on a rear edge of said base extending above said top base surface and below said bottom base surface,
        first and second double base sidewalls disposed on side edges of said base, extending above said top base surface and below said bottom base surface,
        a first pair of hinge elements having a first configuration formed on a rear portion of said double base sidewalls above said base top surface,
        a second pair of hinge elements having said first configuration formed on a rear portion of said double base sidewalls below said top base surface,
    a double cover element including;
        a rectangular cover having top and bottom planar surfaces;
        a double cover front wall disposed on a front edge of said cover extending above and said top cover surface and below said bottom cover surface,
        first and second double cover sidewalls disposed on side edges of said cover extending above said top cover surface and below said bottom cover surface,
        a third pair of hinge elements having a second configuration formed on a rear portion of said double cover sidewalls above said top cover surface,
        a fourth pair of hinge elements having said second configuration formed on a rear portion of said double cover sidewalls below said top cover surface,
    wherein hinge elements of said first and second configurations are complementary and together form a complete hinge such that storage container elements having said first hinge element configuration may be pivotally connected to storage container elements having said second hinge element configuration, and wherein base sidewalls of each storage container element fit within cover sidewalls of adjacent storage containers when said storage container elements are pivotally connected and closed.

2. The system of claim 1, further comprising a combined element including a substantially rectangular member including a top planar base surface and a bottom planar cover surface and further comprising:
    a base portion including;
        a rear wall disposed on a rear edge of said top base surface extending upward,
        first and second base side walls formed on side edges of said top base surface extending upward,
        a fifth pair of hinge elements having said first configuration formed on a rear portion of said base sidewalls above said base surface; and
    a cover portion including;
        a front wall formed on a front edge of said bottom cover surface extending downward,
        first and second cover side walls disposed on side edges of said bottom cover surface extending downward,
        a sixth pair of hinge elements having said second configuration formed on a rear portion of said cover sidewalls below said bottom cover surface.

3. The system of claim 1, further comprising a single base element including;
    a substantially rectangular single base having top and bottom planar surfaces,
    a single base rear wall disposed on a rear edge of said single base extending above said single base top surface,
    first and second single base sidewalls disposed on side edges of said single base, extending above said single base top surface, and
    a seventh pair of hinge elements having said first configuration formed on a rear portion of said single base sidewalls.

4. The system of claim 1, further comprising a single cover element including:
    a substantially rectangular single cover having top and bottom planar surfaces;
    a single cover front wall disposed on a front edge of said single cover extending below said single cover bottom surface,
    first and second single cover sidewalls disposed on side edges of said single cover extending above below said single bottom surface, and
    an eighth pair of hinge elements having said second configuration formed on a rear portion of said cover side walls.

5. The system of claim 1, wherein said first hinge element configuration includes a protrusion and said second hinge element configuration includes a depression.

6. The system of claim 1, wherein said first hinge element configuration includes a depression and said second hinge element configuration includes a protrusion.

7. A system for assembling a storage container having multiple compartments, said system comprising:
    a double base element including;
        a substantially rectangular base having top and bottom planar surfaces,
        a double base rear wall disposed on a rear edge of said base extending above said top base surface and below said bottom base surface, first and second double base sidewalls disposed on side edges of said base, extending above said top base surface and below said bottom base surface, a first pair of hinge elements having a first configuration formed on a rear portion of said double base sidewalls above said base top surface, a second pair of hinge elements having said first configuration formed on a rear portion of said double base sidewalls below said top base surface, a combined element including a substantially rectangular member including a top planar base surface and a bottom planar cover surface and further comprising:

a base portion including;

a rear wall disposed on a rear edge of said top base surface extending upward, first and second base side walls formed on side edges of said top base surface extending upward, a third pair of hinge elements having said first configuration formed on a rear portion of said base sidewalls above said base-surface; and a cover portion including;

a front wall formed on a front edge of said bottom cover surface extending downward, first and second cover side walls disposed on side edges of said bottom cover surface extending downward, a fourth pair of hinge elements having a second configuration formed on a rear portion of said cover sidewalls below said bottom cover surface, wherein hinge elements of said first and second configurations are complementary and together form a complete hinge such that storage Container elements having said first hinge element configuration may be pivotally connected to storage container elements having said second hinge element configuration, and wherein base sidewalls of each storage container element fit within cover sidewalls of adjacent storage containers when said storage container elements are pivotally connected and closed.

8. The system of claim 7, further comprising a double cover element including:

a rectangular cover having top and bottom planar surfaces;

a double cover front wall disposed on a front edge of said cover extending above and said top cover surface and below said bottom cover surface, first and second double cover sidewalls disposed on side edges of said cover extending above said top cover surface and below said bottom cover surface, a fifth pair of hinge elements having a second configuration formed on a rear portion of said double cover sidewalls above said top cover surface, and a sixth pair of hinge elements having said second configuration formed on a rear portion of said double cover sidewalls below said top cover surface.

9. The system of claim 7, further comprising a single base element including:

a substantially rectangular single base having top and bottom planar surfaces, a single base rear wall disposed on a rear edge of said single base extending above said single base top surface, first and second single base sidewalls disposed on side edges of said single base, extending above said single base top surface, and a seventh pair of hinge elements having said first configuration formed on a rear portion of said single base sidewalls.

10. The system of claim 7, further comprising a single cover element including:

a substantially rectangular single cover having top and bottom planar surfaces;

a single cover front wall disposed on a front edge of said single cover extending below said single cover bottom surface, first and second single cover sidewalls disposed on side edges of said single cover extending above below said single bottom surface, and an eighth pair of hinge elements having said second configuration formed on a rear portion of said cover side walls.

11. The system of claim 7, wherein said first hinge element configuration includes a protrusion and said second hinge element configuration includes a depression.

12. The system of claim 7, wherein said first hinge element configuration includes a depression and said second hinge element configuration includes a protrusion.

13. A system for assembling a storage container having multiple compartments, said system comprising:

a combined element including a substantially rectangular member including a top planar base surface and a bottom planar cover surface and further comprising:

a base portion including;

a rear wall disposed on a rear edge of said top base surface extending upward, first and second base side walls formed on side edges of said top base surface extending upward, a first pair of hinge elements having a first configuration formed on a rear portion of said base sidewalls above said base surface, a cover portion including;

a front wall formed on a front edge of said bottom cover surface extending downward, first and second cover side walls disposed on side edges of said bottom cover surface extending downward, a second pair of hinge elements having said second configuration formed on a rear portion of said cover sidewalls below said bottom cover surface, and a double cover element including;

a rectangular cover having top and bottom planar surfaces;

a double cover front wall disposed on a front edge of said cover extending above and said top cover surface and below said bottom cover surface, first and second double cover sidewalls disposed on side edges of said cover extending above said top cover surface and below said bottom cover surface, a third pair of hinge elements having a second configuration formed on a rear portion of said double cover sidewalls above said top cover surface, and a forth pair of hinge elements having said second configuration formed on a rear portion of said double cover sidewalls below said top cover surface.

wherein hinge elements of said first and second configurations are complementary and together form a complete hinge such that storage container elements having said first hinge element configuration may be pivotally connected to storage container elements having said second hinge element configuration, and wherein base sidewalls of each storage container element fit within cover sidewalls of adjacent storage containers when said storage container elements are pivotally connected and closed.

14. The system of claim 13 further comprising:
a double base element including;
 a substantially rectangular base having top and bottom planar surfaces,
 a double base rear wall disposed on a rear edge of said base extending above said top base surface and below said bottom base surface,
 first and second double base sidewalls disposed on side edges of said base, extending above said top base surface and below said bottom base surface,
 a fifth pair of hinge elements having said first configuration formed on a rear portion of said double base sidewalls above said base top surface, and
 a sixth pair of hinge elements having said first configuration formed on a rear portion of said double base sidewalls below said top base surface.

15. The system of claim 13, further comprising a single base element including:
 a substantially rectangular single base having top and bottom planar surfaces,
 a single base rear wall disposed on a rear edge of said single base extending above said single base top surface,
 first and second single base sidewalls disposed on side edges of said single base, extending above said single base top surface, and
 a seventh pair of hinge elements having said first configuration formed on a rear portion of said single base sidewalls.

16. The system of claim 13, further comprising a single cover element including:
 a substantially rectangular single cover having top and bottom planar surfaces;
 a single cover front wall disposed on a front edge of said single cover extending below single cover bottom surface,
 first and second single cover sidewalls disposed on side edges of said single cover extending above below said single bottom surface, and
 an eighth pair of hinge elements having said second configuration formed on a rear portion of said cover side walls.

17. The system of claim 13, wherein said first hinge element configuration includes a protrusion and said second hinge element configuration includes a depression.

18. The system of claim 13, wherein said first hinge element configuration includes a depression and said second hinge element configuration includes a protrusion.

19. A system for assembling a storage container having multiple compartments, said system comprising: at least two adjacent combined elements, each combined element including a substantially rectangular member including a top planar base surface and a bottom planar cover surface and further comprising:
a base portion including;
 side edges, a front edge, and a rear edge bordering said top planar surface,
 a rear wall integral with said rear edge of said top base surface, wherein said rear wall extends upward from said rear edge,
 first and second base side walls formed on said side edges of said top base surface extending upward and extending forward to front portions of said top base surface front edge, wherein rear portions of said side walls are coupled to opposite ends of said rear wall so as to form corners between said top base surface, said rear wall, and said side walls,
 a first pair of hinge elements having a first configuration formed on a rear portion of said base sidewalls above said base surface, and
a cover portion including;
 side edges, a front edge, and a rear edge bordering said bottom cover surface,
 a front wall formed on said front edge of said bottom cover surface extending downward,
 first and second cover side walls disposed on said side edges of said bottom cover surface extending from said front edge of said bottom cover surface to said rear edge of said bottom cover surface and downward,
 a second pair of hinge elements having said second configuration formed on a rear portion of said cover sidewalls below said bottom cover surface,
wherein hinge elements of said first and second configurations are complementary and together form a complete hinge such that storage container elements having said first hinge element configuration may be pivotally connected to storage container elements having said second hinge element configuration, and wherein base sidewalls of each storage container element fit within cover sidewalls of adjacent storage containers when said storage container elements are pivotally connected and closed.

20. The system of claim 19 further comprising: a double base element including;
 a substantially rectangular base having top and bottom planar surfaces,
 a double base rear wall disposed on a rear edge of said base extending above said top base surface and below said bottom base surface,
 first and second double base sidewalls disposed on side edges of said base, extending above said top base surface and below said bottom base surface,
 a third pair of hinge elements having said first configuration formed on a rear portion of said double base sidewalls above said base top surface, and
 a fourth pair of hinge elements having said first configuration formed on a rear portion of said double base sidewalls below said top base surface.

21. The system of claim 19, further comprising a double cover element including:
 a rectangular cover having top and bottom planar surfaces; a double cover front wall disposed on a front edge of said cover extending above and said top cover surface and below said bottom cover surface, first and second double cover sidewalls disposed on side edges of said cover extending above said top cover surface and below said bottom cover surface, a fifth pair of hinge elements having said second configuration formed on a rear portion of said double cover sidewalls above said top cover surface, and a sixth pair of hinge elements having said second configuration formed on a rear portion of said double cover sidewalls below said top cover surface.

22. The system of claim 19, further comprising a single base element including:

a substantially rectangular single base having top and bottom planar surfaces, a single base rear wall disposed on a rear edge of said single base extending above said single base top surface, first and second single base sidewalls disposed on side edges of said single base, extending above said single base top surface, and a seventh pair of hinge elements having said first configuration formed on a rear portion of said single base sidewalls.

23. The system of claim 19, further comprising a single cover element including:

a substantially rectangular single cover having top and bottom planar surfaces;

a single cover front wall disposed on a front edge of said single cover extending below said single cover bottom surface, first and second single cover sidewalls disposed on side edges of said single cover extending above below said single bottom surface, and an eighth pair hinge elements having said second configuration formed on a rear portion of said cover side walls.

24. The system of claim 19, wherein said first hinge element configuration includes a protrusion and said second hinge element configuration includes a depression.

25. The system of claim 19, wherein said first hinge element configuration includes a depression and said second hinge element configuration includes a protrusion.

* * * * *